US008413150B2

(12) United States Patent  
Lu et al.

(10) Patent No.: US 8,413,150 B2  
(45) Date of Patent: Apr. 2, 2013

(54) SYSTEMS AND METHODS FOR DATA AWARE WORKFLOW CHANGE MANAGEMENT

(75) Inventors: Ruopeng Lu, Calamvale (AU); Marek Kowalkiewicz, Moggill (AU); Marita Kruempelmann, Dielheim (DE); Stefan Baeuerle, Rauenberg-Rotenberg (DE)

(73) Assignee: SAP AG, Walldorf (DE)

( * ) Notice: Subject to any disclaimer, the term of this patent is extended or adjusted under 35 U.S.C. 154(b) by 674 days.

(21) Appl. No.: 12/533,202

(22) Filed: Jul. 31, 2009

(65) Prior Publication Data

US 2011/0029983 A1    Feb. 3, 2011

(51) Int. Cl.  
G06F 9/46 (2006.01)  
G06F 9/44 (2006.01)  
G06Q 10/00 (2012.01)

(52) U.S. Cl. ........ 718/100; 718/106; 717/104; 717/106; 717/155; 705/7.26; 705/7.27

(58) Field of Classification Search .............. 718/1–106; 717/104–109, 151–161; 705/7.26, 7.27, 705/301  
See application file for complete search history.

(56) References Cited

U.S. PATENT DOCUMENTS

| | | | | |
|---|---|---|---|---|
| 5,940,804 | A * | 8/1999 | Turley et al. | 705/7.26 |
| 7,493,594 | B2 * | 2/2009 | Shenfield et al. | 717/107 |
| 2004/0078105 | A1 * | 4/2004 | Moon et al. | 700/100 |
| 2004/0133457 | A1 * | 7/2004 | Sadiq et al. | 705/7 |
| 2005/0043982 | A1 * | 2/2005 | Nguyen | 705/8 |
| 2006/0074736 | A1 * | 4/2006 | Shukla et al. | 705/8 |
| 2006/0294048 | A1 * | 12/2006 | Shukla et al. | 707/1 |
| 2009/0164996 | A1 | 6/2009 | Baeuerle et al. | |
| 2009/0281777 | A1 | 11/2009 | Baeuerle et al. | |

OTHER PUBLICATIONS

Dongsoo Han, Jaeyong Shim; Connector-oriented Workflow System for the Support of Structured Ad hoc Workflow; Proceedings of the 33rd Hawaii International Conference on System Sciences—2000; 9 pages.*  
Shazia Sadiq; Data Flow and Validation in Workflow Modelling; 2003, Australian Computer Society, Inc; pp. 207-213.*  
'Master's Thesis xBPMN ++ Towards Executability of BPMN: Data Perspective and Process Instantiation' [online]. Schreiter, 2008, [retrieved on Jul. 28, 2009]. Retrieved from the Internet: <URL:thesis.torben-schreiter.de/>, 154 pages.  
'Metamodel and Workflow Management System for Object-Oriented Business Processes' [online]. Bauman, 2006, [retrieved on Jul. 28, 2009]. Retrieved from the Internet: <URL:ipipan.waw.pl/~subieta/prace%20magisterskie/Workflows%20in%2OSBQL%20-%20Bauman.pdf>, 93 pages.  
'Workflow Data Patterns: Identification, Representation and Tool Support' [online]. Russell et al., 2005, [retrieved on Jul. 28, 2009]. Retrieved from the Internet: <URL:workflowpatterns.com/documentation/documents/data_patternsER2005.pdf>, 16 pages.

* cited by examiner

*Primary Examiner* — Abdullah Al Kawsar  
(74) *Attorney, Agent, or Firm* — Fish & Richardson P.C.

(57) ABSTRACT

A method includes providing a baseline workflow as an electronic representation of an actual workflow, the baseline workflow including baseline tasks, data items, and baseline data scopes, and providing a fragment workflow as an electronic representation of an actual fragment workflow, the fragment workflow including at least one fragment task, and at least one fragment data scope. A baseline data scope is identified as an affected data scope based on a structural change operation, the baseline workflow and the fragment workflow, and the affected data scope is compared to the at least one fragment data scope to identify at least one change operation. The fragment and baseline workflows are integrated based on the structural change operation to provide an integrated workflow, and the at least one data scope change operation is executed to provide at least one integrated data scope in the integrated workflow.

21 Claims, 17 Drawing Sheets

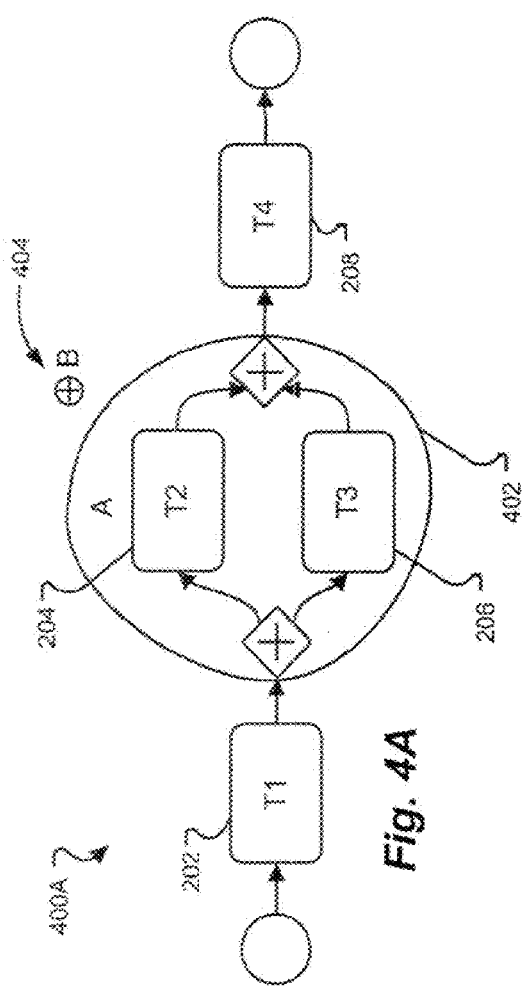
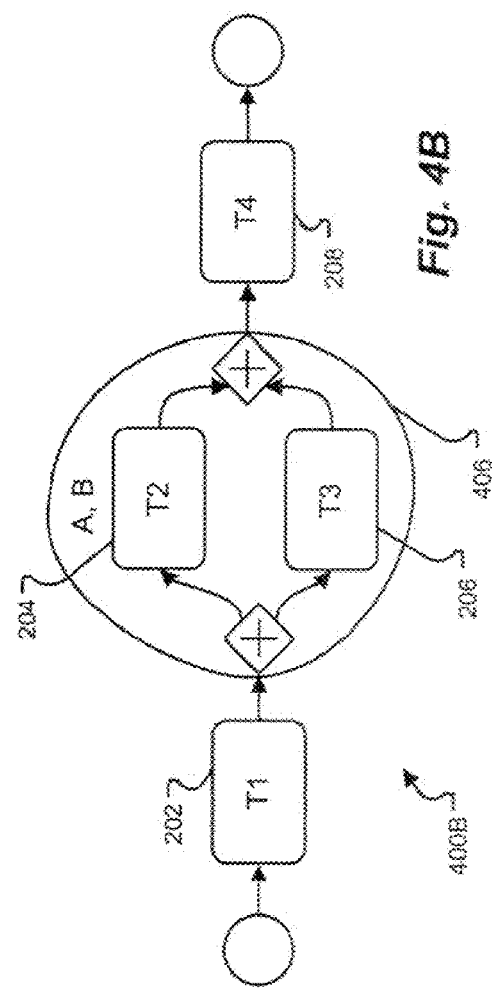

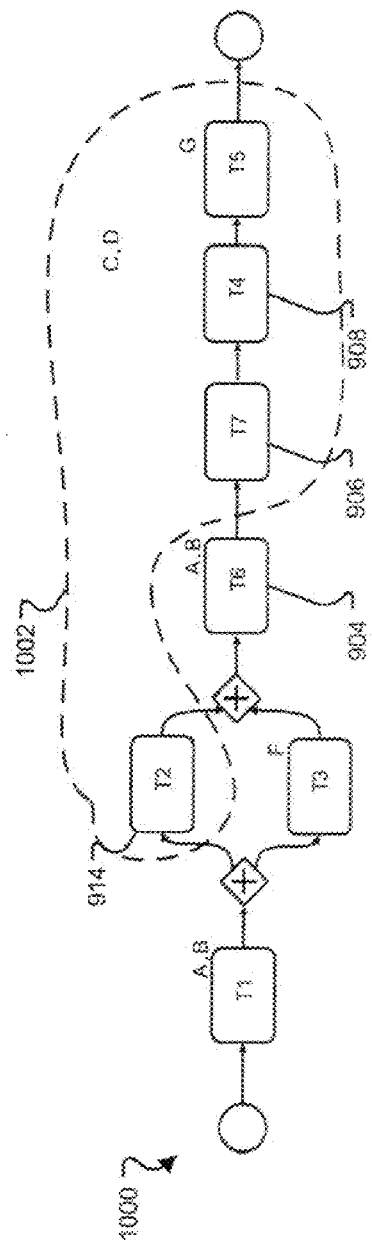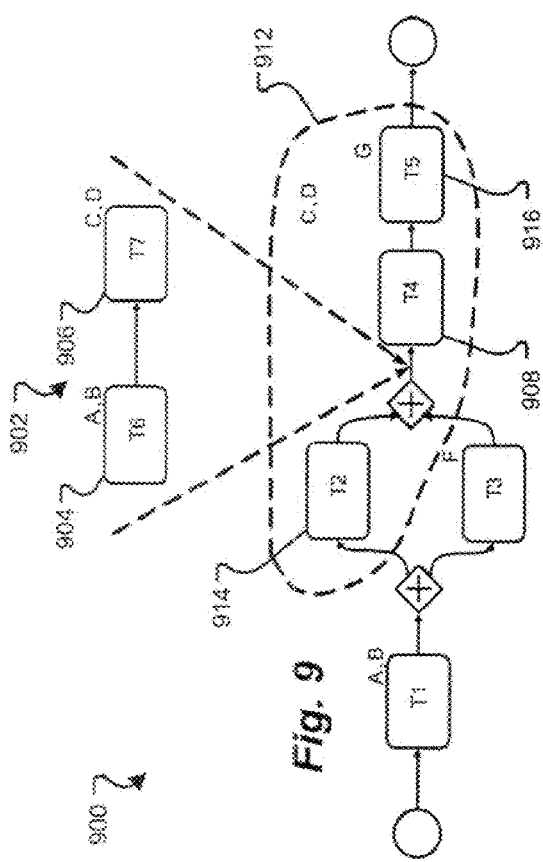

SYSTEMS AND METHODS FOR DATA AWARE WORKFLOW CHANGE MANAGEMENT

BACKGROUND

Business processes may include a collection of related, structured tasks or tasks that produce a specific service or product. Business processes can be decomposed into several sub-processes, which have their own attributes, but also contribute to achieving the goal of a higher level process. The analysis of business processes typically includes the mapping of processes and sub-processes down to an activity level.

Business processes can be modeled in a business process model to describe core aspects of a business, including purpose, offerings, strategies, infrastructure, organizational structures, trading practices, and operational processes and policies. The business process model can define a number of methods in which operations are carried out to accomplish the intended objectives of an organization. In some implementations, a business process model can describe a workflow or integration between business processes.

SUMMARY

Implementations of methods in accordance with the present disclosure include methods of managing data scopes in a flexible workflow. In some implementations, a method includes providing a baseline workflow as an electronic representation of an actual workflow, the baseline workflow including a plurality of baseline tasks, a plurality of data items, and a plurality of baseline data scopes that relate baseline tasks to data items of the plurality of data items, and providing a fragment workflow as an electronic representation of an actual fragment workflow, the fragment workflow including at least one fragment task, and at least one fragment data scope, the at least one fragment data scope relating the at least one fragment task to data items of the plurality of data items. At least one of the plurality of baseline data scopes is identified as an affected data scope based on a structural change operation, the baseline workflow and the fragment workflow, and, for each affected data scope, the affected data scope is compared to the at least one fragment data scope to identify at least one data scope change operation. The fragment workflow is integrated with the baseline workflow based on the structural change operation to provide an integrated workflow, and the at least one data scope change operation is executed to provide at least one integrated data scope in the integrated workflow.

In some implementations, the identifying at least one of the plurality of baseline data scopes as an affected data scope includes identifying at least one of the plurality of baseline data scopes as an affected data scope, when the structural change operation is within the at least one of the plurality of baseline data scopes, and identifying at least one of the plurality of baseline data scopes as an affected data scope, when the at least one of the plurality of baseline data scopes relates to at least one data item that is also related to a baseline data scope already identified as an affected data scope.

In some implementations, the comparing, for each affected data scope, the affected data scope to the at least one fragment data scope to identify at least one data scope change operation comprises at least one of determining that data items related to the affected data scope are all common to data items related to the at least one fragment data scope, and identifying the at least one data scope change operation as a split of the affected data scope, determining that data items related to the at least one fragment data scope are all common to data items related to the affected data scope, and identifying the at least one data scope change operation as a split of the at least one fragment data scope, and identifying the at least one data scope change operation as a split of the affected data scope and a split of the at least one fragment data scope.

In some implementations, the method further includes at least one of preventing the at least one integrated data scope from expanding a data visibility of a fragment task within the integrated workflow, preventing the at least one integrated data scope from reducing a data visibility of a fragment task within the integrated workflow, and reducing a number of overlapping integrated data scopes within the integrated workflow.

In some implementations, the at least one data scope change operation includes at least one of an add operation, a remove operation, an expand operation, a contract operation, a split operation and a merge operation.

In some implementations, the method further includes retrieving the baseline workflow from a plurality of baseline workflows stored in digital memory, and retrieving the fragment workflow from a plurality of fragment workflows stored in digital memory.

In some implementations, the method further includes instantiating the baseline workflow to generate an instance of the baseline workflow, executing the instance of the baseline workflow across a plurality of networked computers, instantiating the integrated workflow to generate an instance of the integrated workflow, and updating the instance of the baseline workflow being executed across the plurality of networked computers based on the instance of the integrated workflow.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIGS. 4A-4B are schematic illustrations modeling exemplar add structural change operations using data visibility management notation in accordance with implementations of the present disclosure.

FIG. 9 is a schematic illustration of an exemplar safe upgrading process on a workflow model.

FIG. 10 is a schematic illustration of an exemplar safe downgrading process on a workflow model.

Like reference symbols in the various drawings indicate like elements.

DETAILED DESCRIPTION

Figure 1:
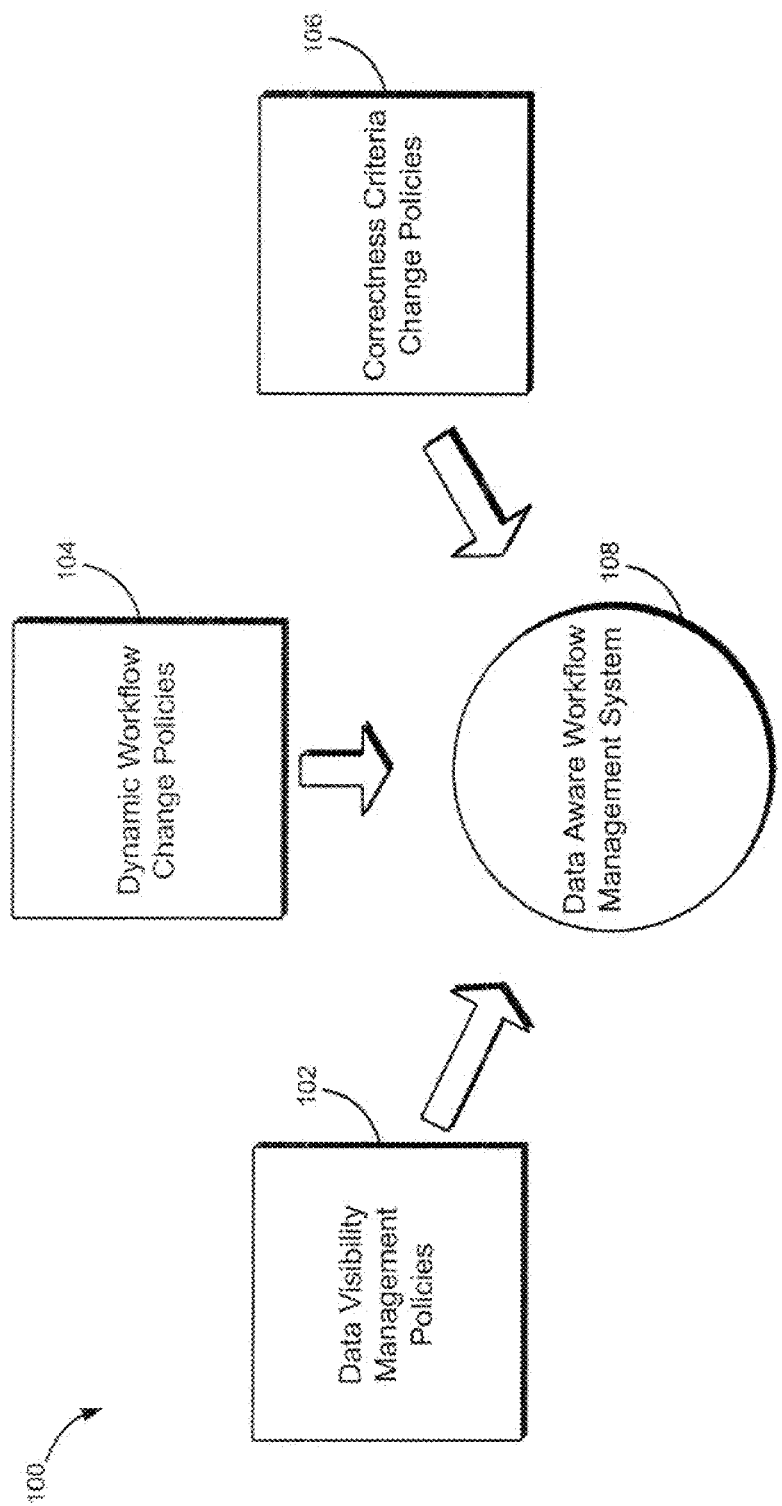
FIG. 1 is a block diagram of an exemplar workflow management system in accordance with implementations of the present disclosure.

FIG. 1 is a block diagram of an exemplar workflow management process 100. The workflow management process 100 can manage workflow changes and data visibility in business processes performed in an Enterprise Resource Planning (ERP) computer system, for example. Managing workflow changes may include managing how processes are inserted, removed, expanded, contracted, split, merged, or otherwise modified in a workflow system. Managing data visibility may include managing how data is captured and utilized in a business process and determining which data elements can be viewed by various components of a workflow system. In general, the workflow management process 100 can link the chronological and logical sequence of workflow tasks to a set of evaluation conditions or workflow policies, as discussed in further detail below. The workflow management process 100 can monitor the workflow tasks according to the workflow policies.

In one example, the workflow management process 100 represents a data aware workflow system that can map both predefined processes and ad-hoc processes to workflow policies in an electronic document management architecture. A workflow generally includes a sequence of operations, tasks, templates, or other events. A data aware workflow includes specific data parameters with respect to the workflow that can be used to optimize processes in the workflow. In general, data aware workflow systems provide efficient and flexible management of business processes, including management of information, resources, personnel, manufacturing, transportation, and service delivery. Data aware workflow systems can receive data parameters that can influence the behavior of a particular workflow process. For example, data aware workflow systems may be aware of previous sessions, conversations, transactions, or other memories of prior tasks that occurred within the system.

Referring to FIG. 1, the workflow management process 100 includes data visibility management policies 102, dynamic workflow change policies 104, and correctness criteria change policies 106, each of which can provide input to data aware workflow change policies 108. The data visibility management policies 102 can provide rules for associating one or more workflow tasks with one or more data objects. The data visibility management policies 102 may describe the privileges for accessing data objects for a particular task group. For example, the data visibility management policies 102 can dictate which data elements and tasks can be viewed by various data objects in the workflow process 100.

In some implementations, the data visibility management policies 102 may include a set of graphical notations for modeling data visibility in a workflow model. A workflow model represents a template used to model complex business processes in the workflow management process 100. The data visibility management policies 102 may also include a series of operations for manipulating data visibility policies.

The dynamic workflow change policies 104 can trigger automatic processing in the process 100. Dynamic workflow change policies 104 may affect workflow structure changes, organizational changes (e.g., resource allocation), informational changes (e.g., data flow), and operational perspective changes.

The correctness criteria change policies 106 can provide operational guidelines for maintaining correct data visibility during changes in workflows at runtime. For example, the correctness criteria change policies 106 can prevent arbitrary structural changes in a workflow process from violating existing data visibility management policies 102. In particular, when structural changes to workflow instances are required at runtime, the process 100 can determine whether such changes would affect the defined data visibility policies 102 for the instance. In general, the process 100 can associate one or more data visibility change operations for each workflow change operation to preserve data visibility correctness in the workflow.

The data visibility management policies 102, the dynamic workflow change policies, and the correctness criteria change policies 106 can be made available to the data aware workflow change policies 108. The data aware workflow change policies 108 represent coordinated structural changes and data changes governed by the policies 102, 104, and 106. The data aware workflow change policies 108 can associate one or more data visibility change operations for each major workflow change operation. The association can be used to preserve data visibility correctness in the process of workflow changes.

The process 100 can implement task data in various ways. In one example, the process 100 can define data elements as parameters to a particular task. The data elements are then "owned" by the task, by definition. In some implementations, the data is valid during the period when the owner task is being executed. In another example, the process 100 can employ a larger scale process aware information system (PAIS) where data objects can be designed and implemented separate from workflows or business processes. In such an approach, data objects are instantiated and exist in an independent lifecycle. In addition, a link can be established between one or more data objects and a workflow task, when the data objects are requested to be visible to a particular task in a workflow.

After building a particular workflow model, the process 100 can, for example, instantiate a baseline workflow to generate an instance of the baseline workflow. The process 100 can execute the instance of the baseline workflow across any number of networked computers. The process 100 can instantiate the integrated workflow to generate an instance of the workflow. Upon generating the instance of the workflow, the process 100 can update the instance of the baseline workflow across any or all networked computers based on the instance of the integrated workflow.

The techniques and components described herein may be implemented within an Enterprise Service Architecture (ESA) environment, often termed a Service Oriented Architecture (SOA). In certain implementations, SOA can be considered a blueprint for an adaptable, flexible, and open architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises rules framework, design tools, methodologies, services and processes, an abstraction layer for objects, and user interface and process pattern libraries. The composite application framework supports model-driven application composition, so a user may build applications and/or implement supply chain policies with as little programming as possible, which often results in reduced development and deployment time for new/modified applications and business-pattern-oriented integration.

Figure 2:
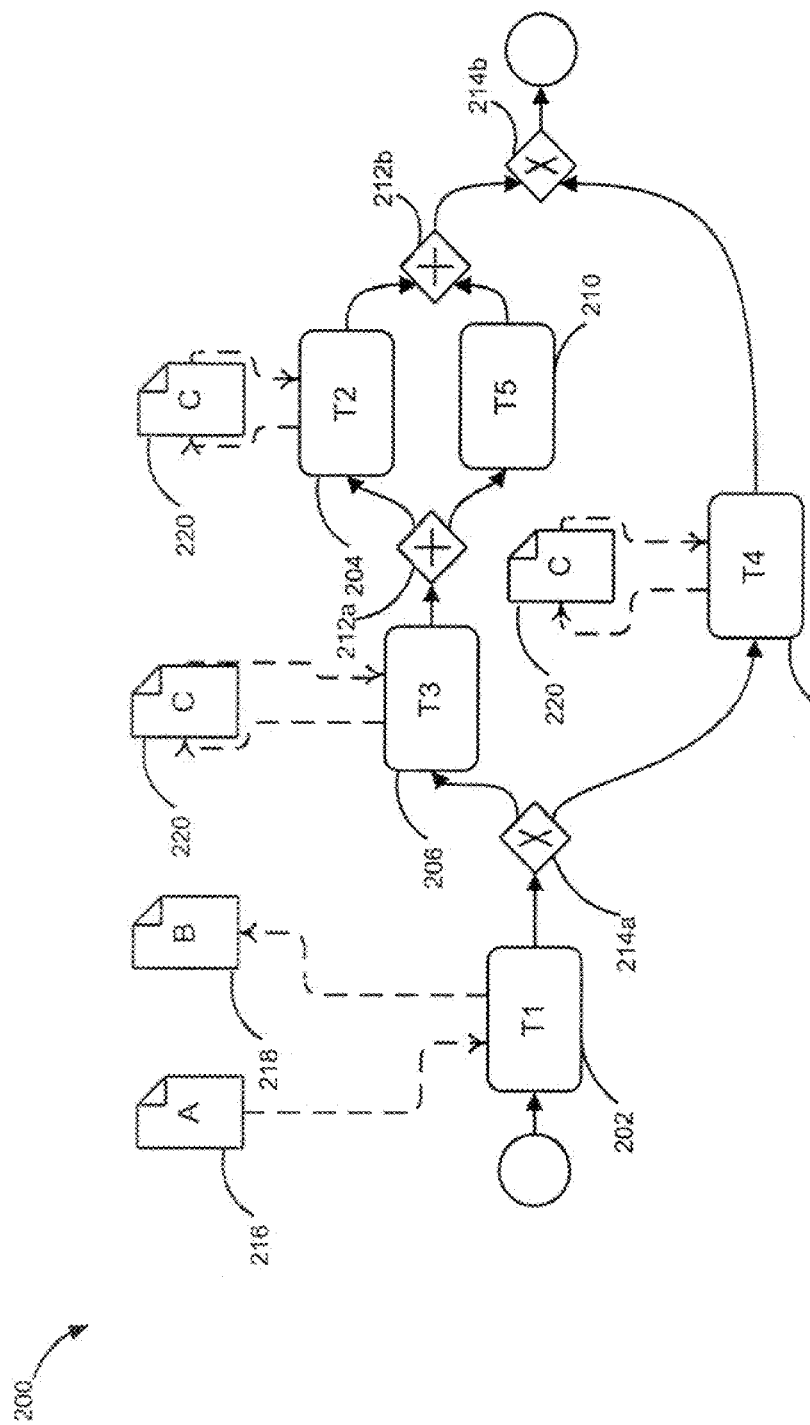
FIG. 2 is a schematic illustration of an exemplar data visibility notation corresponding to an exemplar data workflow model.

Referring now to FIG. 2, a schematic illustration of an exemplar data visibility notation corresponds to an exemplar data workflow model 200. The data visibility notation can model both a control flow layer and a data flow layer. The control flow dimension defines the execution order of tasks using different constructors. The data flow dimension defines how data is captured and utilized in a business process. The data flow layer can be built upon the control flow layer of information.

The data workflow model 200 includes one or more linked workflow activities or "tasks" (T1) 202, (T2) 204, (T3) 206, (T4) 208, and (T5) 210 connected by a collection of arrows to indicate the order of execution. The model 200 also includes connecting components [+] 212a-b and [X] 214a-b to indicate how to operate on or connect tasks. The model 200 can also include artifacts that may be utilized to express additional information from underlying process logic. In some implementations, artifacts may facilitate process automation. One example artifact includes a data object. As shown in FIG. 2, the data objects include (A) 216, (B) 218, and (C) 220. Data objects can be related to one or more workflow tasks. For example, the workflow tasks 202-210 can manipulate (e.g., create, read, modify, delete, etc.) a data object if such privilege has been allowed for this task. The privilege to manipulate a data object may be defined by a data scope.

The data scope in a workflow model represents an association between a collection of one or more workflow tasks and a collection of one or more data objects which indicates the privilege of manipulation of these data objects by the tasks. A data scope can be modeled as a solid or dotted circle covering a set of workflow tasks and data objects.

Data scopes can be further classified by different combinations of workflow tasks and the data objects the tasks may contain. For example, data scopes may be categorized as a task data scope, a group data scope, or a workflow data scope. A task data scope may indicate that the data scope relates a single workflow task to one or more data objects in a workflow that are only accessible by the enclosed task. For example, in a purchase approval process, the data object 216 may represent an "invoice data object" (A) 216 and the data object (B) 218 may represent a "request for tender" data object. The data objects (A) 216 and (B) 218 can be created and updated by the task (T1) 202 which may be an "authorize purchase" task. Thus, the data objects (A) 216 and (B) 218 represent task data for the workflow task (T1) 202.

A group data scope may indicate that the data scope relates more than one workflow nodes to one or more data objects in the workflow. For example, a purchase order data object may be accessible by a cost center and a purchase center in the same workflow instance. In this example, the group data is accessible by a small group of collaborating tasks within the same workflow if, for example, the group uses local data sharing. The data object (C) 220 represents a group of is a group data of tasks (T2) 204, (T3) 206, and (T4) 208.

The group data scope can be used within several workflow tasks to coordinate certain actions. An arbitrary data scope can be implemented by defining a fragment (as opposed to a block) of actions to which the data elements are bound. A fragment of a process may represent a sub-process within an action or process or a portion of an action or process. In a group data scope, a link can be established between one or more data objects and a group of tasks.

A workflow data scope may indicate that the data scope relates all workflow tasks to one or more data objects in a workflow. For example, in an insurance claim investigation workflow, a claim file data object should be accessible by all tasks in the same workflow instance. Workflow data can be modeled for data objects with lower privacy concern, and is commonly used for data based routing. The workflow data scope can be implemented by establishing a reference link between one or more data objects and the workflow. In this case, each instance of the workflow may refer to the same group of instances of the data objects.

Figure 3:
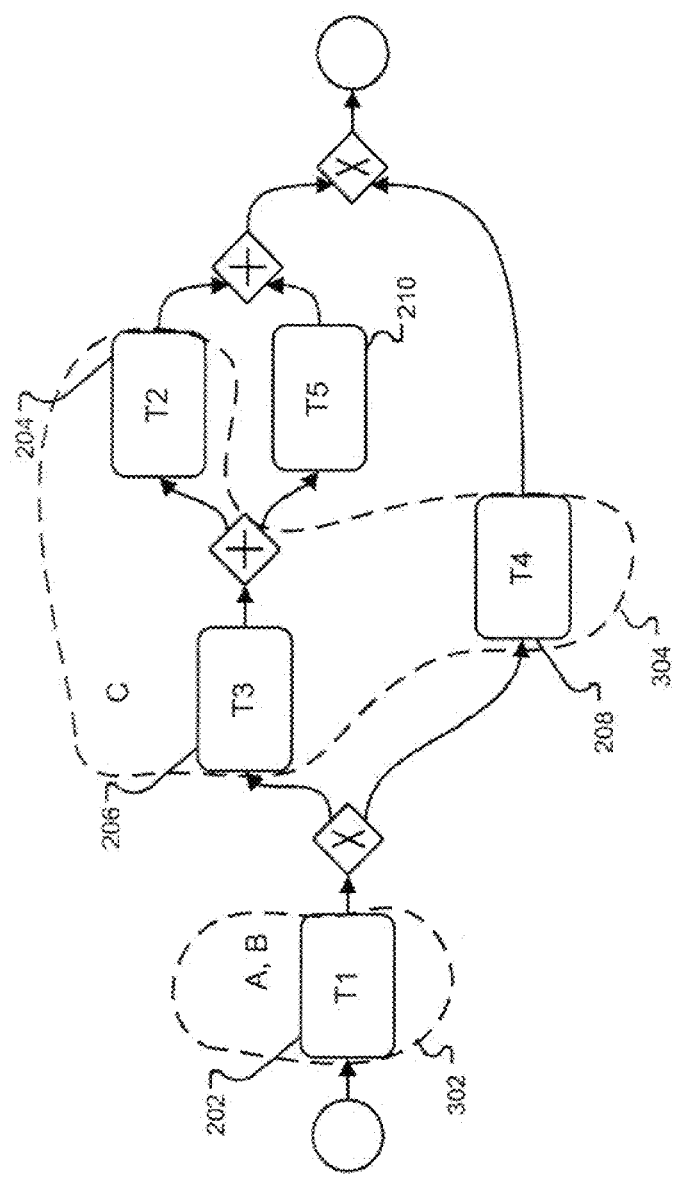
FIG. 3 is a schematic illustration of the exemplar data workflow of FIG. 2 including data visibility management notation in accordance with implementations of the present disclosure.

FIG. 3 is a schematic illustration of the exemplar data workflow of FIG. 2 rewritten using data visibility management notation in accordance with the present disclosure. The task data scope 302 is represented by a circle covering the single workflow task (T1) 202 and the set of data objects (A) and (B) associated with the task. The group data scope 304 is represented by a circle covering the group of workflow tasks (T2), (T3), and (T4) as well as the data object (C) associated with the tasks. Depending on the structure of a process model, a group data scope can cover workflow tasks within a block structure or across different blocks in the process model.

In some implementations, FIG. 3 may also include a workflow data scope. For example, the entire model may be enveloped in a workflow data scope. The workflow data scope in this example is a special case of group data scope, where the group of workflow tasks covers all tasks in the workflow.

FIGS. 4A-8B represent exemplar elementary structural change operations for manipulating data scopes in workflow processes. The change operations include, but are not limited to, an add operation, a remove operation, an expand operation, a contract operation, a split operation, and a merge operation. These change operations may provide an end-to-end coverage of common scenarios when data scopes are to be modified, including increasing or decreasing the group of tasks sharing common data views, modifying the group of data in the scope, as well as splitting and merging similar data scopes. Using the above operations, other operations can be defined to exhibit more advanced scenarios.

In general, structural change operations can provide the flexibility of a user or administrator to modify a workflow process. This flexibility allows the workflow to be executed based on a loosely, or partially specified model, where the full specification of the model is made at runtime, and may be unique to each instance. Workflows which depend on the presence of such flexibility for the satisfactory attainment of process goals can be found in many applications. Rather than enforcing control through a rigid, or highly prescriptive model that attempts to capture every step and every option within the process, a flexible workflow model is defined in a more relaxed or "flexible" manner, that allows individual instances to determine their own unique processes.

Managing change in workflows has been recognized as a complex issue, where the challenge is to allow for dynamic model modification without compromising the syntax and semantic correctness. According to the scope of change, change operations can be performed on the schema, instance, or fragment level. Some examples of structural change operations in flexible workflows include an insert fragment operation, a delete fragment operation, a move fragment operation, a replace fragment operation, a swap fragment operation, an extract sub process operation, an inline sub process operation, an embed fragment in loop operation, a parallelize fragment operation, an embed fragment in conditional branch operation, an add control dependency operation, a remove control dependency operation, and an update condition operation.

The insert fragment operation can be used to add process fragments to a workflow model. There are systems which only allow serial insertion of a fragment between two directly succeeding tasks. Other systems follow a more general approach allowing the user to insert new fragments between two arbitrary sets of tasks. Special cases of the latter variant include the insertion of a fragment in parallel to another fragment or the association of the newly added fragment with an execution condition (e.g., a conditional insertion). The delete fragment operation can be used to remove a process fragment.

The move fragment operation can be used to shift a process fragment from its current position to a new position in the same workflow model. The move process fragment pattern could be realized by combining a delete and an insert fragment operation. The replace fragment operation supports the replacement of a process fragment by another process fragment. It can be implemented based on an insert process fragment operation and a delete process fragment operation. The swap fragment operation allows the swapping of a process fragment with another process fragment. This adaptation can be implemented based on the combined use of the delete fragment operation and the insert process fragment.

The extract sub process operation allows the extraction of an existing process fragment from a workflow model and an encapsulation of the fragment into a separate sub-workflow model. The inline sub-process allows an inline addition of a sub-workflow model into a parent workflow model, which can be used to flatten a hierarchy of an overall workflow process. The embed fragment in loop operation embeds an existing process fragment in a loop in order to allow for a repeated execution of the respective process fragment. This can be realized based on the insert fragment operation, the add control dependency operation, and the remove control dependency operation.

The parallelize fragment operation enables the parallelization of process fragments which were defined to be executed in sequence. It can be realized by combining the add control dependency operation and the remove control dependency operation. The embed fragment in conditional branch operation can embed an existing process fragment into a conditional branch, which consequently is only executed if certain conditions are met. This can be implemented based on the insert process fragment operation, the add control dependency operation, and the remove control dependency operation.

The add control dependency operation provides an additional control edge for synchronizing the execution order of two parallel tasks. The remove control dependency operation allows a control dependency and its attributes to be removed from a workflow model. The update condition operation allows update transition conditions in a workflow model. In some implementations, the update condition operation may be used to ensure that a new transition condition is accurate and correct.

FIGS. 4A-4B are schematic illustrations modeling exemplar add structural change operations in accordance with implementations of the present disclosure. Referring to FIG. 4A, a data workflow model 400A is shown with tasks (T1) 202, (T2) 204, (T3) 206, and (T4) 208. The data workflow model 400A includes a data scope 402 with visibility of the data object (A) and tasks (T2) 204 and (T3) 206. The workflow management process 100 can use an add operation to increase the visibility of a group of tasks within the same data scope by relating additional data objects to the group, such that the newly added data objects will be visible to every task in the scope. In this example, the add operation is denoted by a symbol (+B) 404 which expresses a change operation on the set of data objects in the scope 402. The symbol (+B) 404 pertains to adding a particular data object (B) to the scope 402. Referring to FIG. 4B, a data workflow model 400B is shown with the added data object (B) within a newly defined data scope 406. As such, the tasks (T2) 204 and (T3) 206 have visibility of the data objects (A) and (B).

Figure 5A:
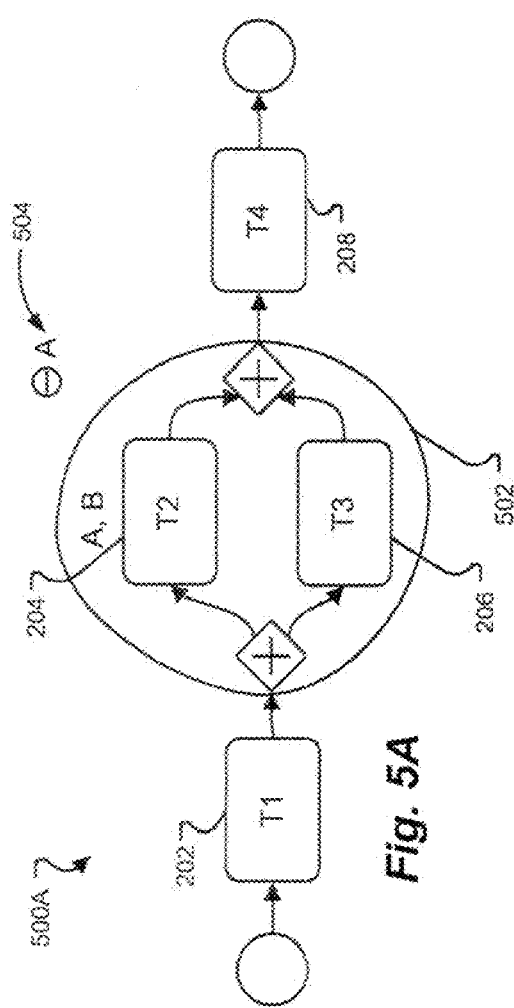
FIGS. 5A-5B are schematic illustrations modeling exemplar remove structural change operations using data visibility management notation in accordance with implementations of the present disclosure.
Figure 5B:
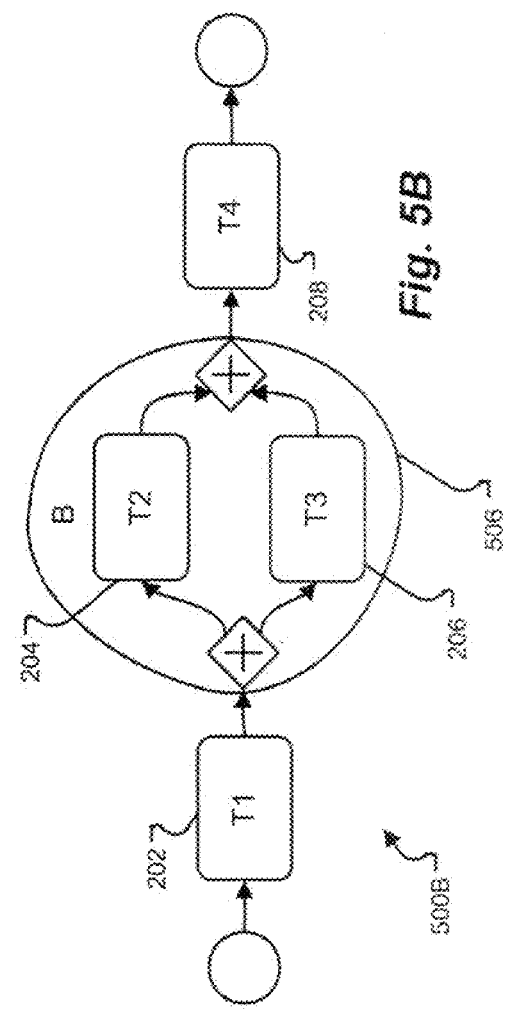

FIGS. 5A-5B are schematic illustrations modeling remove structural change operations in accordance with implementations of the present disclosure. Referring to FIG. 5A, a data workflow model 500A is shown with tasks (T1) 202, (T2) 204, (T3) 206, and (T4) 208. The data workflow model 500A includes a data scope 502 with visibility of the data objects (A) and (B) and tasks (T2) 204 and (T3) 206. The workflow management process 100 can use a remove operation to decrease the visibility of the group of tasks within the same scope by detaching one or more data objects from the scope, such that the detached data object will no longer be visible to any task within the scope 502. In this example, the remove operation is denoted by a symbol (−A) 504 which expresses a change operation on the set of data objects in the scope 502.

A remove operation is generally denoted by a subtraction symbol (−) to visually express a remove change operation on the set of data objects in the scope 502. In the depicted example, the symbol (−A) 504 pertains to removing the data object (A) from the scope 502. Referring to FIG. 5B, a data workflow model 500B is shown with the data object (B) and not (A) since the process 100 removed the data object (A). A new defined data scope 506 is also depicted in model 500B. As such, the tasks (T2) 204 and (T3) 206 have visibility of the data object (B).

Figure 6A:
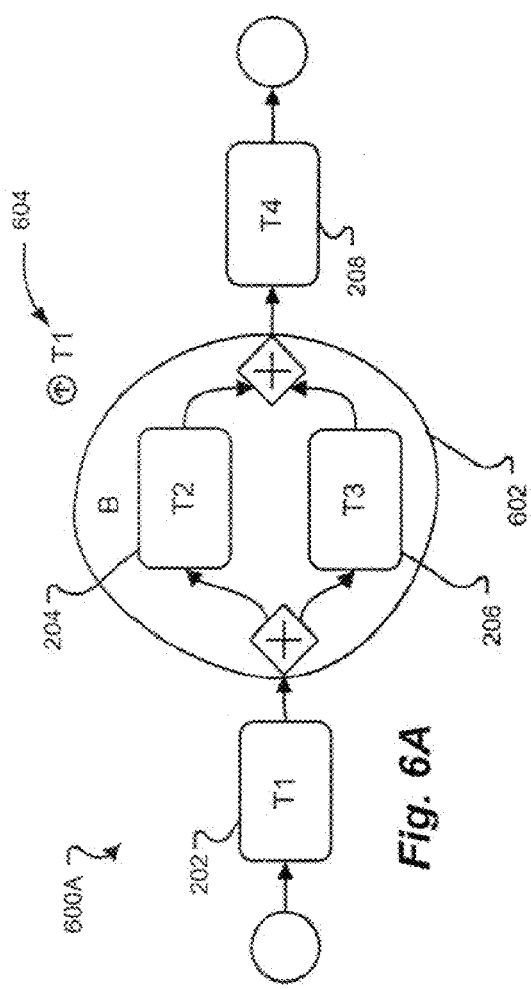
FIGS. 6A-6B are schematic illustrations modeling exemplar expand structural change operations using data visibility management notation in accordance with implementations of the present disclosure.
Figure 6B:
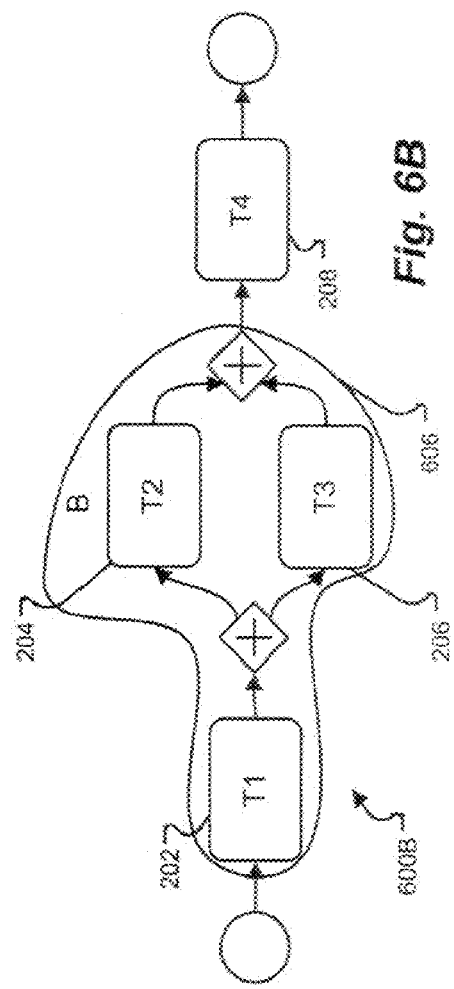

FIGS. 6A-6B are schematic illustrations modeling expand structural change operations in accordance with implementations of the present disclosure. Referring to FIG. 6A, a data workflow model 600A is shown with tasks (T1) 202, (T2) 204, (T3) 206, and (T4) 208. The data workflow model 600A includes a data scope 602 with visibility of the data object (B) and the tasks (T2) 204 and (T3) 206. The workflow management process 100 can use an expand operation to enlarge the scope by adding one or more tasks to the existing group of tasks within the scope 602. The expanded group of tasks may share the same data visibility as those in the original scope. In this example, the expand operation is denoted by an up arrow (↑) symbol 604. The expand operation is denoted by the up arrow symbol to visually express the change operation on the set of tasks in the scope 602. In the depicted example, the symbol 604 pertains to expanding the scope 602 to include the additional task (T1) 202. Referring to FIG. 6B, a data workflow model 600B is shown with the included task (T1) 202 in an expanded data scope 606. As such, the tasks (T1) 202, (T2) 204, and (T3) 206 have visibility of the data object (B).

Figure 7A:
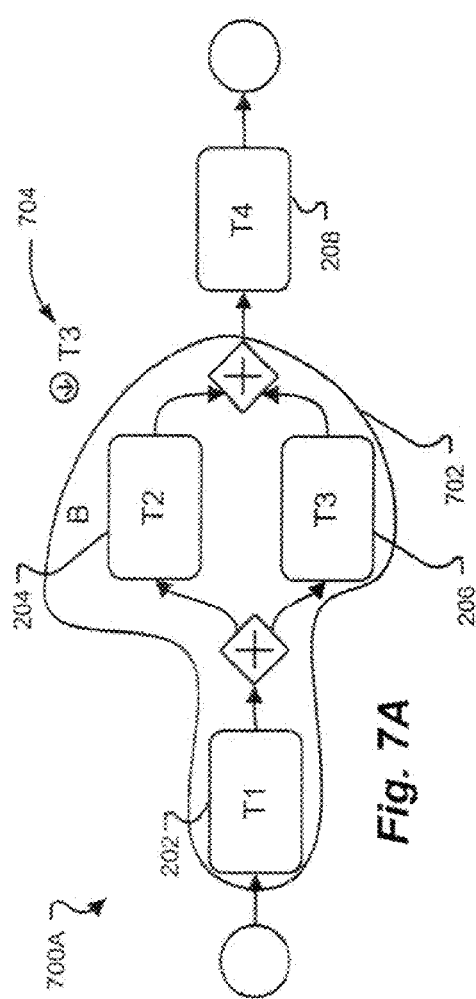
FIGS. 7A-7B are schematic illustrations modeling exemplar contract structural change operations using data visibility management notation in accordance with implementations of the present disclosure.
Figure 7B:
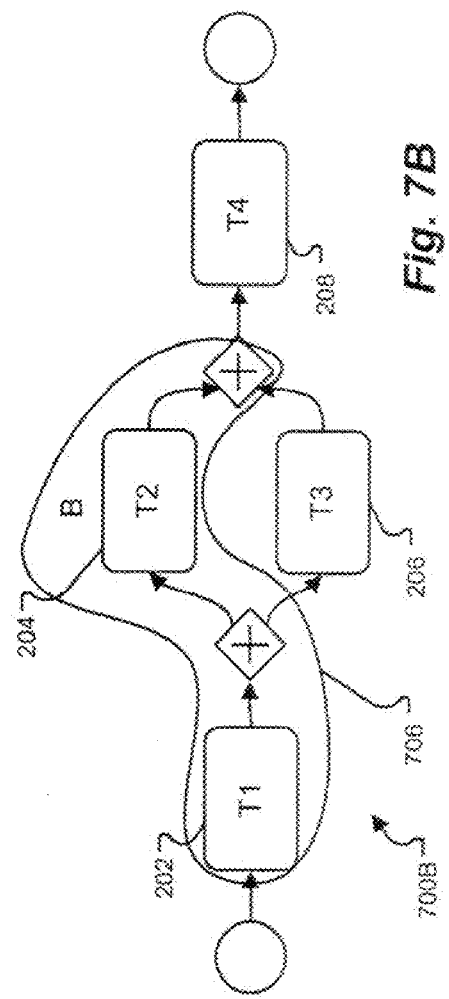

FIGS. 7A-7B are schematic illustrations modeling contract structural change operations in accordance with implementations of the present disclosure. Referring to FIG. 7A, a data workflow model 700A is shown with tasks (T1) 202, (T2) 204, (T3) 206, and (T4) 208. The data workflow model 700A includes a data scope 702 with visibility of the data object (B). The workflow management process 100 can use a contract operation to reduce the scope 702 by removing one or more tasks from the existing group of tasks within the scope 702. In some implementations, the remaining tasks will maintain the same data visibility as before an operation change. The contract operation is denoted by a down arrow (↓) symbol 704 to visually express the change operation on the set of tasks in the scope 702. In the depicted example, the symbol 704 pertains to contracting the scope 702 to remove the task (T3) 206. Referring to FIG. 7B, a data workflow model 700B is shown with the excluded task (T3) 206 in a contracted data scope 706. As such, the tasks (T1) 202 and (12) 204 have visibility of the data object (B) and the task (T3) 206 no longer has visibility of the data object (B).

Figure 8A:
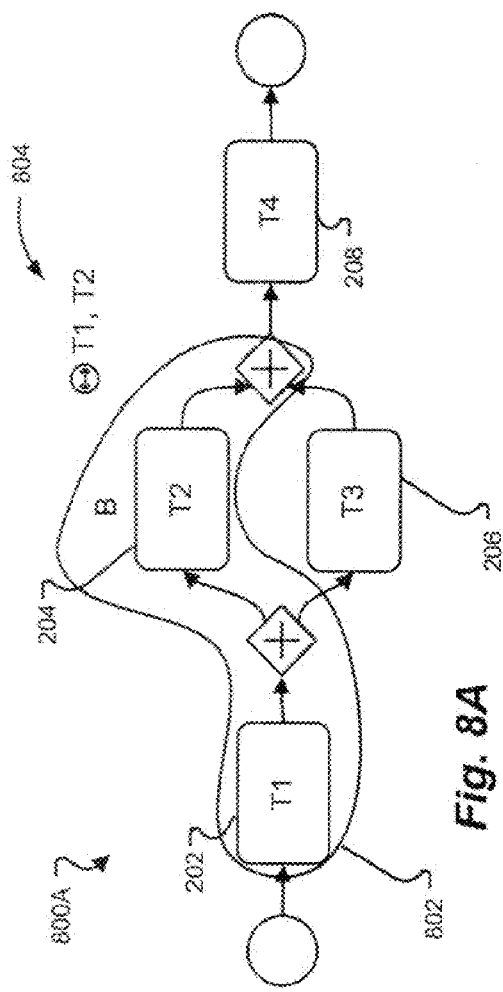
FIGS. 8A-8B are schematic illustrations modeling exemplar split structural change operations using data visibility management notation in accordance with implementations of the present disclosure.
Figure 8B:
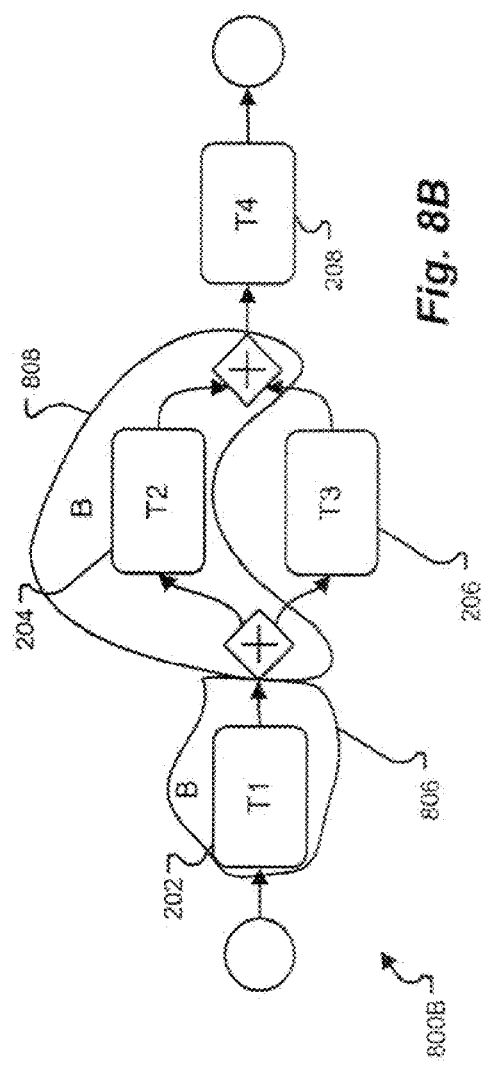

FIGS. 8A-8B are schematic illustrations modeling split structural change operations in accordance with implementations of the present disclosure. Referring to FIG. 8A, a data workflow model 800A is shown with tasks (T1) 202, (T2) 204, (T3) 206, and (T4) 208. The data workflow model 800A includes a data scope 802 with visibility of the data object (B). The workflow management process 100 can use a split operation to separate the original data scope into two smaller scopes, each of which will still be related to the same group of data objects as in the original scope 802. The split operation is denoted by a double arrow (⇔) symbol 804 to visually express the change operation on the scope 802. In the depicted example, the symbol 804 pertains to splitting the scope 802 by splitting the tasks (T1) 202 and (T2) 204. Referring to FIG. 8B, a data workflow model 800B is shown with the task (T1) 202 in a data scope 806 and the task (T2) 204 in a data scope 808. As such, the tasks (T1) 202 and (T2) 204 both have independent visibility of the data object (B) from their respective data scopes 806 and 808.

In a similar fashion, a merge structural change operation (not shown) can be performed. The merge operation can combine two data scopes (e.g., data scope 806 and data scope 808) by merging the two groups of tasks (T1) 202 and (T2) 204, and the data object (B) into a single group of tasks and data objects respectively. Merging the tasks (T1) 202 and (T2) 204 may begin with the exemplar data workflow model 800B, for example, and result in the exemplar data workflow model 800A.

In some implementations, complex operations can be constructed using the aforementioned elementary operations. For example, a data change operation can be defined to swap data objects (e.g., data objects A and B) of a first scope to another group of data objects (e.g., data objects C, D, and E) of a second scope. In this example, the operation can be defined as a conjunction of the remove operation for removing data objects (A) and (B), and the add operation to insert new data objects (C), (D), and (E). Similarly, a task change operation can also be defined as a single operation for changing the coverage of the scope on workflow tasks. Furthermore, multiple split operations or multiple merge operations can be defined by combining two or more elementary split or merge operations. For example, the workflow management process 100 can split a data scope containing tasks (T1) 202, (T2) 204, and (T3) 206 into three scopes includes performing two consecutive split operations by splitting the group of three into (i) a group of two (e.g., tasks (T1) 202 and (T2) 204) and (ii) a group of one (e.g., task (T3) 206). After splitting the group of three, the process 100 can perform a second split on the group of two (e.g., tasks (T1) 202 and (T2) 204), which in turn, yields three smaller data scopes that each contain a single task (T1) 202, (T2) 204, or (T3). In some implementations, a new data scope can be created by expanding an empty group of tasks and adding data objects into the new scope.

Referring now to FIG. 9, a schematic illustration of an exemplar safe upgrading process on a workflow model 900 is provided. The workflow model 900 is an electronic representation of an actual workflow. The safe upgrading process ensures that process fragments do not gain additional data visibility after a structural change. The safe upgrading process may prevent an unintentional, upgrade of data visibility caused by structural changes such as inserting a process fragment (containing one or more task). If the safe upgrading process is not followed, a particular workflow may cause a loss of privacy for a business partner or data object.

The workflow model 900 is a baseline workflow model, into which a process fragment 902 is to be inserted. The process fragment 902 includes a task (T6) 904 and a task (T7) 906. In the exemplar arrangement of FIG. 9, the process fragment 902 may be inserted before a task (T4) 908. The workflow model 900 provides a baseline workflow with a number of baseline tasks, data items, and data scopes that relate the baseline tasks to the data items.

The process fragment 902 is a fragment workflow with the tasks (T6) 904 and (T7) 906. As shown in FIG. 9, both the process fragment 902 and the workflow model 900 have defined data visibility, where the task (T6) 904 is visible to a data object (A) and a data object (B). Similarly, the task (T7) 906 is visible to a data object (C) and a data object (D). Each fragment data scope relates a fragment task to one or more data items.

An insertion point 910 is covered by a data scope 912. The data scope 912 has a defined data visibility of data objects (C) and (D). This implies that tasks within the scope 912 (e.g., tasks (T2) 914, (T4) 908, and (T5) 916) are visible to the same data objects (C) and (D). As a result of insertion, it is not desirable (e.g., it may be rendered unsafe or less secure) for the task (T6) to gain visibility to the data objects (C) and (D). Thus, appropriate adjustment to the data scope 912 definition may be performed in order to avoid such a situation.

The workflow model 900 can be used to identify one or more baseline data scopes as an affected data scope based on a structural change operation (e.g., an add operation, a split operation, etc.), the baseline workflow, and the fragment workflow. For each affected data scope, the affected data scope, can be compared to at least one fragment data scope to identify at least one data scope change operation. The change operation may result in integrating the fragment workflow with the baseline workflow based on the structural change operation to provide an integrated workflow. The data scope change operation can be performed to provide at least one integrated data scope in an integrated workflow 1000.

Referring now to FIG. 10, a schematic illustration of an exemplar safe downgrading process on a workflow model 1000 is provided. The safe downgrading process ensures that process fragments do not lose data visibility after a structural change. The safe downgrading process may prevent an unintentional downgrade of data visibility caused by structural changes such as deleting or moving process fragments. If the safe downgrading process is not followed, a particular workflow may be susceptible to a loss of data visibility privileges for the affected process fragments.

Referring to FIG. 10, as a result of the insertion process performed in FIG. 9, the workflow 1000 is created. The workflow 1000 includes the previously fragmented tasks (T6) 904 and (T7) 906 as part of an integrated workflow model. In addition, the original data scope 912 has been modified according to the data visibilities associated with the task (T6). Specifically, the task (T6) 904 retains data visibility for the data objects (A) and (B) while the task (T7) retains data visibility for the data objects (C) and (D). In this example, the data scope 912 provides visibility to the data objects (C) and (D). Thus, when the process fragments are integrated into the workflow 900, the singular added tasks are determined to be safely upgraded (e.g., included) or safely downgraded (e.g., excluded) in a particular data scope. Here, a new data scope 1002 is created which includes the process fragment task (T7) 906 because the task (T7) 906 already has visibility to data objects (C) and (D). Similarly, the new data scope 1002 excludes the process fragment task (T6) 904 because the task (T6) 904 does not have visibility to the data objects (C) or (D).

Figure 11:
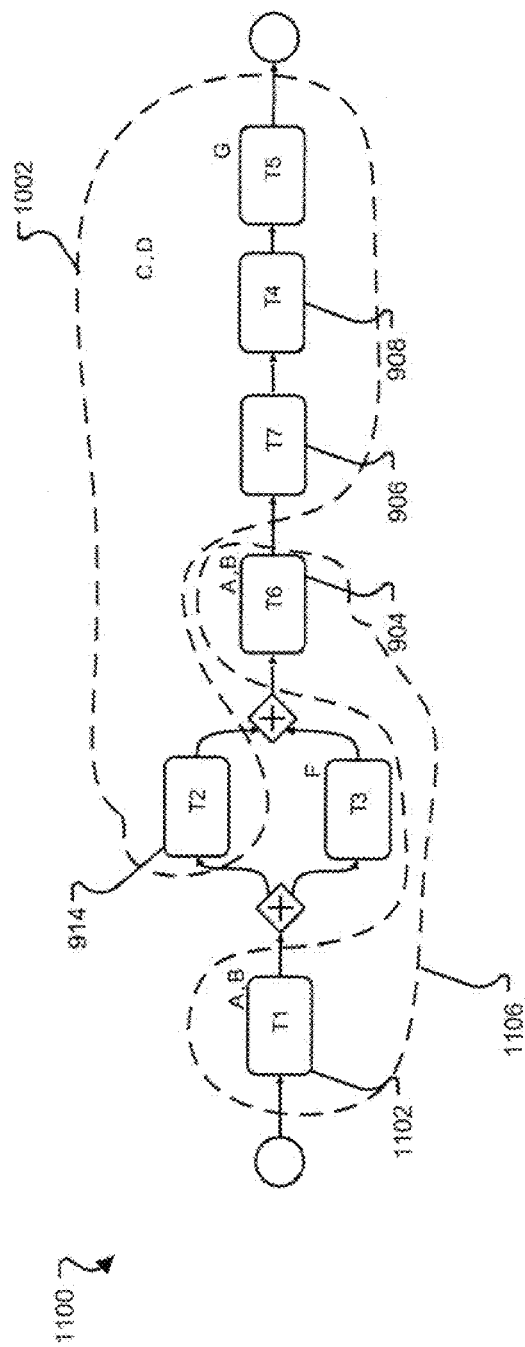
FIG. 11 is a schematic illustration of an exemplar redundancy check process on a workflow model.

Referring now to FIG. 11, a schematic illustration of an exemplar redundancy checking process on a workflow model 1100 is provided. The redundancy checking process ensures that an overlap of data scopes is minimal or non-existent. The redundancy checking process may prevent the creation of a duplicate data scope when a workflow change is performed. Referring to the previous examples in FIGS. 9 and 10 above, the modified workflow model 1100 now contains two tasks (T1) 1102 and (T6) 904 that are both accessible to the same data. For example, the tasks (T1) 1102 and (T6) 904 both have data visibility to the data objects (A) and (B). Instead of having two data visibility definitions, the process 100 can merge two data scopes into one data scope 1106, which contains the data objects (A) and (B), both of which remain visible to the tasks (T1) 1102 and (T6) 904 at the same time. In some implementations, the merged scope is an example of a "soft" correctness requirement to improve presentation of the modified workflow model 1100, since no error would be introduced by redundant scope definitions.

Figure 12:
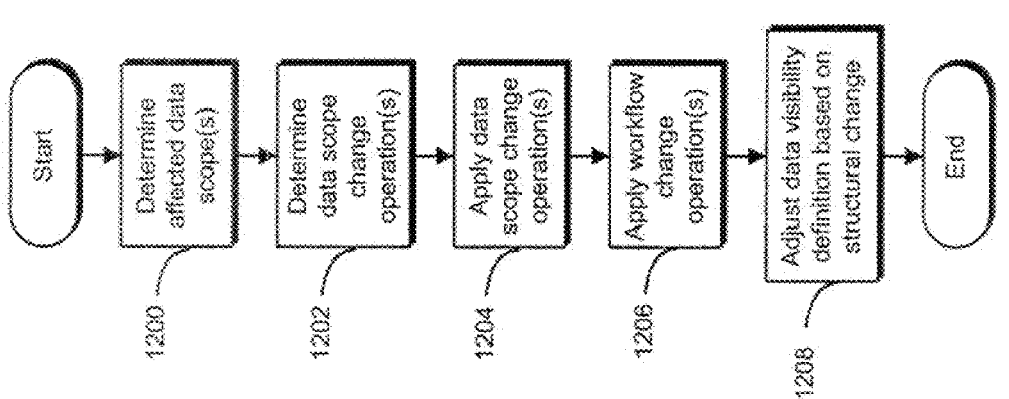
FIG. 12 is a flowchart illustrating exemplar steps that can be executed to provide data aware workflow changes in accordance with implementations of the present disclosure.

FIG. 12 is a flowchart illustrating exemplar steps that can be executed to provide data aware workflow changes in accordance with implementations of the present disclosure. Briefly, the steps include determining an affected scope region, determining data visibility changes, applying workflow change operations, and adjusting the data visibility definition.

In step 1200, which data scopes in a workflow model that will be affected by a particular structural change operation are determined. For example, it can be determined which data scope may be influenced by a structural change by identifying one or more baseline data scopes and determining which of these data scopes include workflow activities that may be affected by an upcoming structural change operation. In step 1202, one or more data scope change operations that will occur on the baseline workflow are determined.

In step 1204, the data scope change operations are applied to the affected workflow regions. This may include applying data visibility rules for data items included within the affected workflow regions. For example, one or more data items can be identified within the baseline data scope and changes to the visibility can be applied appropriately. In step 1206, the workflow change operations are applied to the data scopes, workflow, data visibility, and data items. In step 1208, the data visibility definition is adjusted based on the applied structural changes. For example, the correctness of the data visibility for particular data items within the baseline data scope and the modified data scope can be preserved. FIGS. 15-18 below describe examples of providing data aware workflow changes according to the steps 1200-1208.

Figure 13:
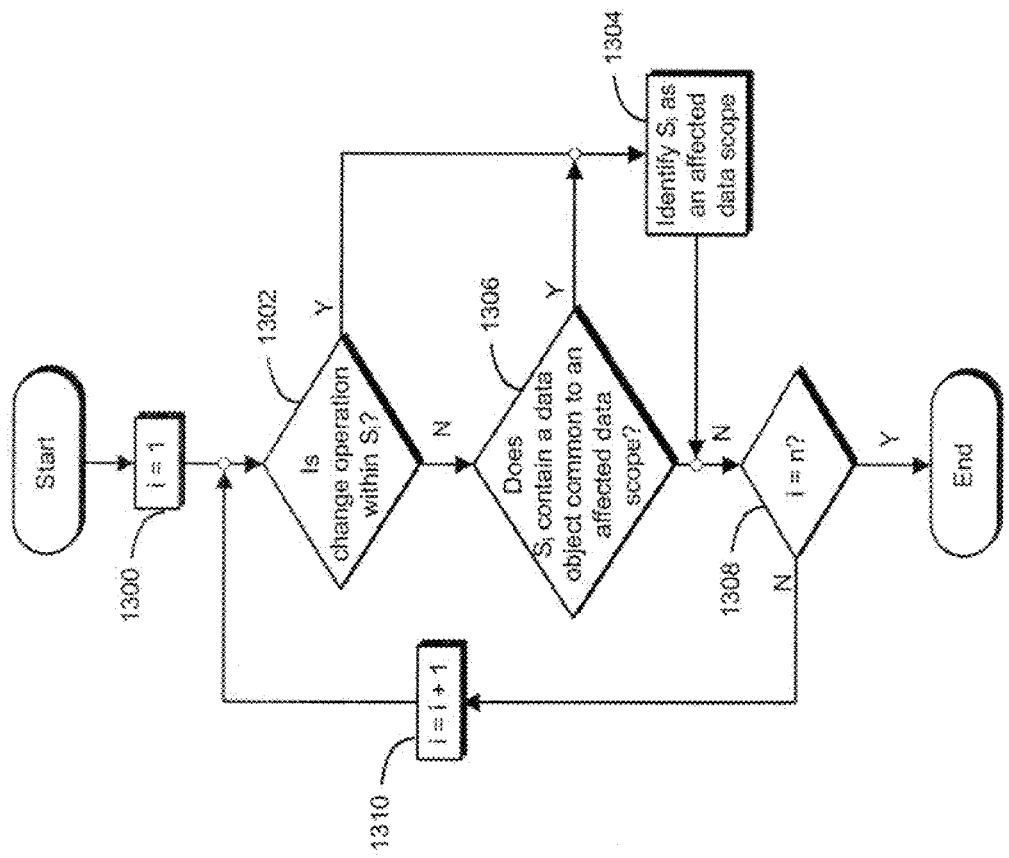
FIG. 13 is a flowchart illustrating exemplar steps that can be executed to determine affected data scopes in accordance with implementations of the present disclosure.

Referring now to FIG. 13, a flowchart illustrates exemplar steps that can be executed to determine affected data scopes in accordance with implementations of the present disclosure. Briefly, the steps include determining whether a particular change operation is within a baseline data scope, determining if the baseline data scope contains data objects common to an affected data scope and iterating through several possible change operation loops to make the scope determinations.

In the exemplar process described below, a number of definitions will be used to describe iterations of the processes. For example, (i) will be used as a counter that represents a number of data scopes. The data scope is defined by the symbol (S) with a subscript (e.g., (i), (i+1), etc.) indicating which particular data scope is being processed.

In step 1300, the process initializes a counter (i) representing a data scope that is part of a workflow. The counter (i), in step 1300, is set to "1" (e.g., i=1) indicating the process will be performed on a first identified data scope. In step 1302, it is determined whether a change operation is within a data scope $S_i$. If the change operation is within the data scope $S_i$, the data scope $S_i$ (e.g., the data scope $S_i$ where (i=1)), is identified as an affected data scope, in step 1304. If the change operation is not within the data scope $S_i$, it is determined whether the data scope $S_i$ contains a data object common to a data object in an affected data scope, in step 1306. If a common data object exists between the current data scope under test and an affected data scope, the data scope $S_i$ is identified as an affected data scope, in step 1304. Thus, the current data scope under test is added to the list of affected data scopes for this particular change operation.

If however, it is determined that the data scope $S_i$ does not contain a common data object to an affected data scope in step 1306, it is determined whether all data scopes have been analyzed for scope coverage and data object coverage in step 1308. More specifically, in step 1308, it is determined whether the data scope under test (i) is the last (n) data scope in the workflow (i.e., whether i=n). If i is equal to n, no more data scopes are available for testing in the current workflow (e.g., i=n, where n is the total number of data scopes), and the process ends. If, however, i is not equal to n, there are additional data scopes to test. Consequently, i is incremented by 1 in step 1310, and loops back to step 1302.

Figure 14:
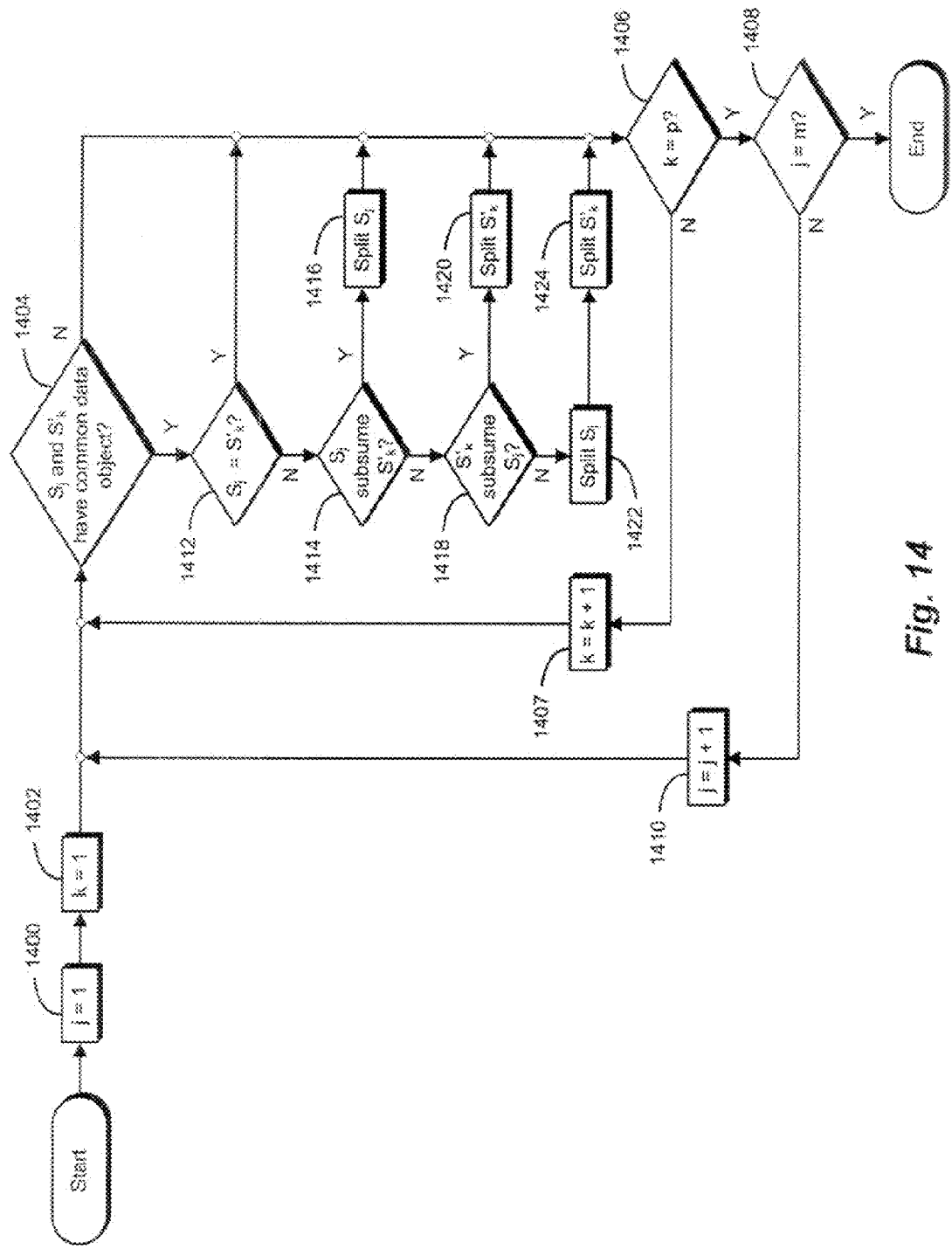
FIG. 14 is a flowchart illustrating exemplar steps that can be executed to determine data scope change operations in accordance with implementations of the present disclosure.

Referring now to FIG. 14, a flowchart illustrates exemplar steps that can be executed to determine data scope change operations in accordance with implementations of the present disclosure. Briefly, the process described in the flowchart determines how data scope change operations will modify the current baseline data scopes in a workflow model.

In the exemplar process described below, a number of definitions will be used to describe iterations of the processes. For example, (j) and (k) will be used as counters that iterate particular data scopes through the processes. Namely, (j) corresponds to data scopes in the fragment workflow, and (k) corresponds to affected data scopes in the baseline workflow. The fragment data scopes are indicated by S with a subscript (e.g., (j), (j+1), etc.) indicating which particular data scope is being processed. The affected data scopes are indicated by S' with a subscript (e.g., (k), (k+1), etc.) indicating which particular affected data scope is being processed. In addition, (p) represents the total number of affected data scopes in a particular workflow, and (m) represents the total number of data scopes in a particular process fragment.

In step 1400, (j) is initialized (e.g., j=1). In step 1402, (k) is initialized (e.g., k=1). In step 1404, it is determined whether the data scopes ($S_j$) and ($S'_k$) share common data objects. If the data scopes ($S_j$) and ($S'_k$) do not share one or more common data objects, it is determined whether k is equal to p in step 1406. If k is not equal to p, k is incremented in step 1407, and the process loops back to step 1404. If k is equal to p, it is determined whether j is equal to m in step 1408. If j is not equal to m, j is incremented in step 1410, and the process loops back to step 1404. If j is equal to m, the process ends. If, in step 1404, it is determined that the data scopes ($S_j$) and ($S'_k$) share common data objects, the process continues in step 1412.

In step 1412, it is determined whether the data objects of data scope ($S_j$) are the same as the data objects of data scope ($S'_k$). If the data objects of data scope ($S_j$) are the same as the data objects of data scope ($S'_k$), no change operations are required, and the process continues in step 1406, as discussed above. If the data objects of data scope ($S_j$) are not the same as the data objects of data scope ($S'_k$), it is determined whether the data objects of data scope ($S_j$) subsume the data objects of data scope ($S'_k$) in step 1414. If the data objects of data scope ($S_j$) subsume the data objects of data scope ($S'_k$), data scope ($S_j$) is split in step 1416, and the process continues in step 1406 as described above. If the data objects of data scope ($S_j$) do not subsume the data objects of data scope ($S'_k$), the process continues in step 1418.

In step 1418, it is determined whether the data objects of data scope ($S'_k$) subsume the data objects of data scope ($S_j$). If the data objects of data scope ($S'_k$) subsume the data objects of data scope ($S_j$), data scope ($S'_k$) is split, and the process continues in step 1406, as described above. If the data objects of data scope ($S'_k$) do not subsume the data objects of data scope ($S_j$), data scope ($S_j$) is split in step 1422, data scope ($S'_k$) is split in step 1424, and the process continues in step 1406, as described above.

In general, the exemplar processes shown in FIGS. 12-14 may be implemented using software instructions stored in a computer-readable storage medium and executed by a processing system including one or more processing apparatus. While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 15:
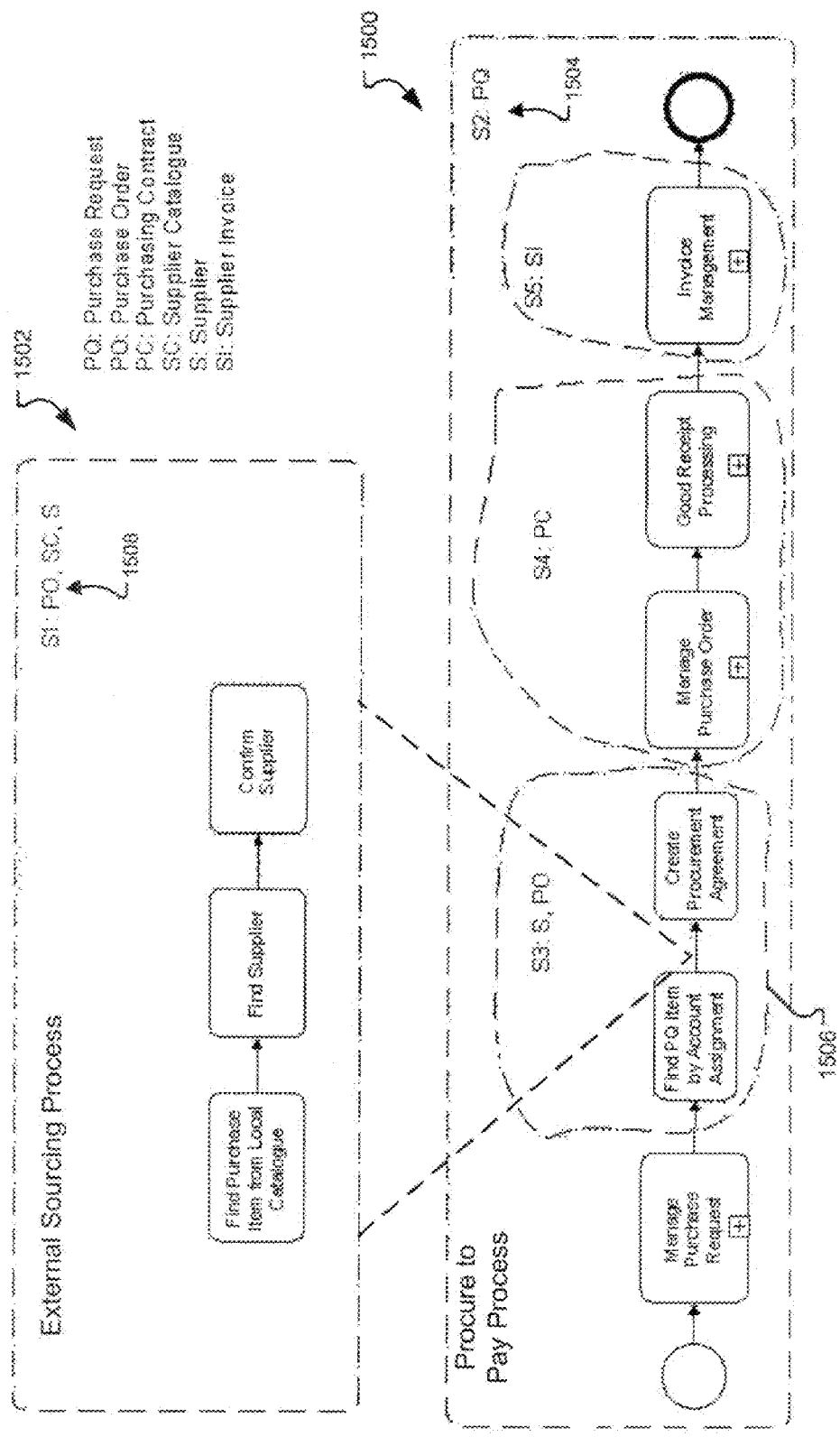
FIG. 15 is a block diagram illustrating an exemplar workflow model for determining affected data scopes.

Referring now to FIGS. 15-18, block diagrams of an exemplar integration of a baseline workflow and a fragment workflow will be described. With particular reference to FIG. 15, a baseline workflow 1500 and a fragment workflow 1502 are provided. Which data scopes in the baseline workflow 1500 that will be affected by insertion of the fragment workflow 1502 can be determined. As discussed herein, a data scope (S) is affected by a structural change operation if the structural change operation is within (S), or the structural change operation contains one or more data objects that are common to a data object in a data scope involved in the first case. In the exemplar illustration of FIG. 15, the affected data scopes when integrating an "external sourcing" process (i.e., fragment 1502) into a "procure to pay" process (i.e., baseline workflow 1500) include (S1) 1508, (S2) 1504, and (S3) 1506. The data scopes (S2) 1504 and (S3) 1506 cover the fragment of the process to be modified (e.g., condition 1). The data scope (S1) covers all external fragments (S1) 1508 to be inserted, while (PO) and (S) are also common in (S3) (e.g., conditions 1 and 2).

Figure 16:
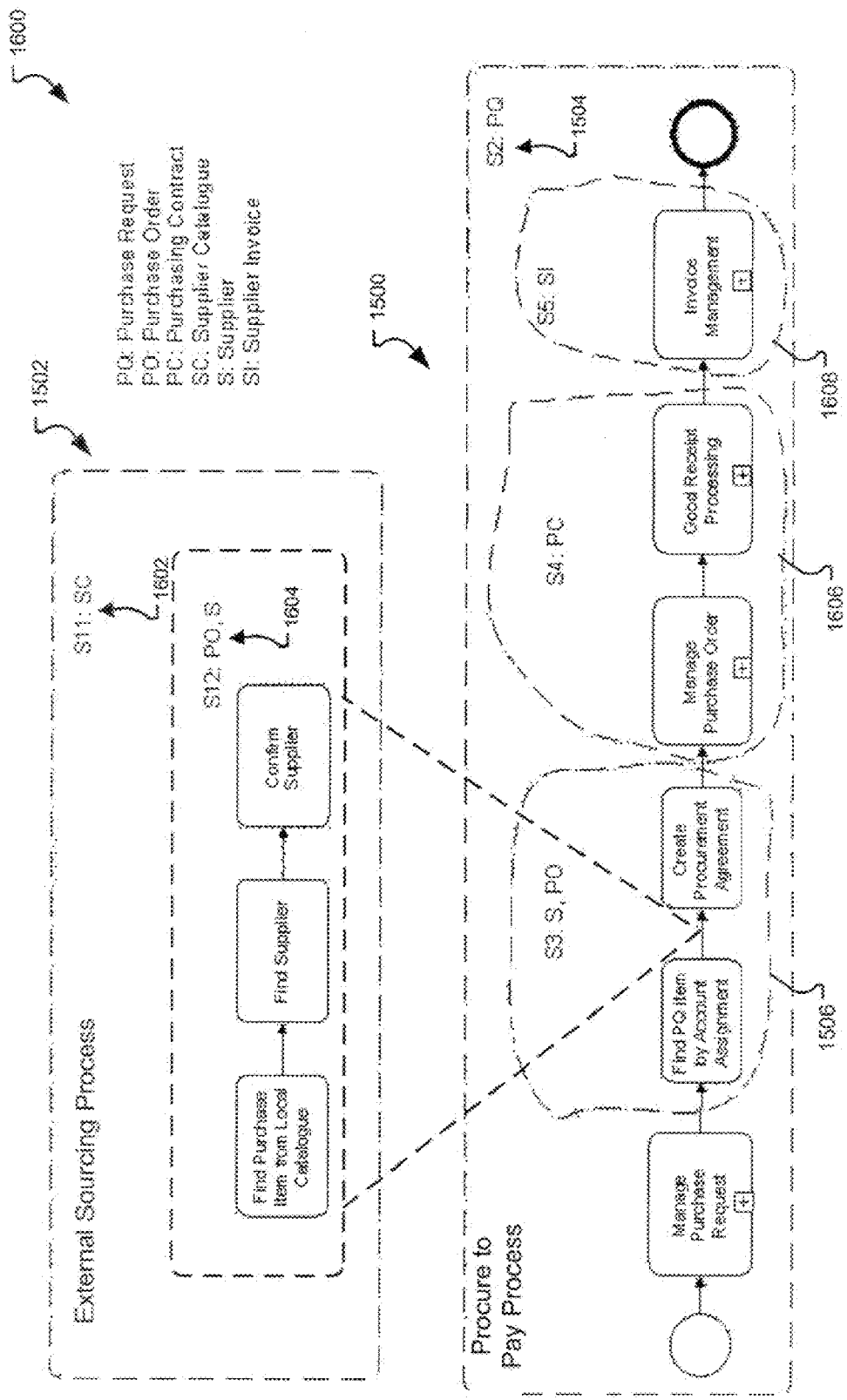
FIG. 16 is a block diagram illustrating an exemplar workflow model for applying visibility changes.

FIG. 16 is a block diagram 1600 illustrating exemplar data visibility changes upon integrating the baseline workflow 1500 and the fragment workflow 1502. As a consequence of the insertion of the fragment workflow 1502 into the baseline workflow 1500, a series of data scope change operations may be performed. For example, for each data scope (SF) in fragment (F), an affected data scope (SP) in process model (P) is compared using the following process. If the data scope (SF) has no common data object with the data scope (SP) (i.e. SF $\cap$ SP=$\emptyset$), then the data visibility change operation should be performed. If the data scope (SF) overlaps with the affected data scope (SP) (i.e. SF $\cap$ SP$\neq \emptyset$) and if the data scope (SF) equals (SP) (i.e., SF $\supset$ SP), then no data change operation should be performed. If the data scope (SF) subsumes the data scope (SP) (i.e., contains at least all data objects in SP (SF $\supset$ SP)), then the data scope (SF) should be split into two data scopes (SF1) and (SF2), where (SF1) contains data objects only visible to (SF) (e.g., SF1=SF−SP), and (SF2) contains the common data objects (i.e., SF2=SF$\cap$SP). If the data scope (SP) subsumes the data scope (SF) (i.e., contains at least all data objects in SF (SF $\subset$ SP)), then the data scope (SP) should be split into two data scopes (SP1) and (SP2), where (SP1) contains data objects only visible to (SP) (e.g., SP1=SP−SF), and (SP2) contains the common data objects (i.e., SP2=SF$\cap$SP). Otherwise, the system can split the data scope (SP) into two data scopes (SP1) and (SP2), and additionally can split the data scope (SF) into two data scopes (SF1) and (SF2) where (SP1) and (SF1) contain data objects only visible to the data scope (SP) (SP1=SP−SF) and SF (SF1=SF−SP) respectively, and (SP2) and (SF2) contain the common data objects (i.e., SP2=SF2=SF$\cap$SP). This is generally describe in the exemplar process of FIG. 14.

For example, the process fragment 1502 includes the data scope (S1) 1508. The data scope (S1) contains data objects (SC), (PO), and (S), while the data scope (S3) 1506 contains (S) and (PO). As a result, the data scope (S1) is split into two data scopes, namely, (S11) 1602 and (S12) 1604. Performing further comparisons using the method above yields the result that it is not required to change data scopes (S2) 1504, (S3) 1506, (S4) 1606, or (S5) 1608 since they are unaffected by the structural change.

Figure 17:
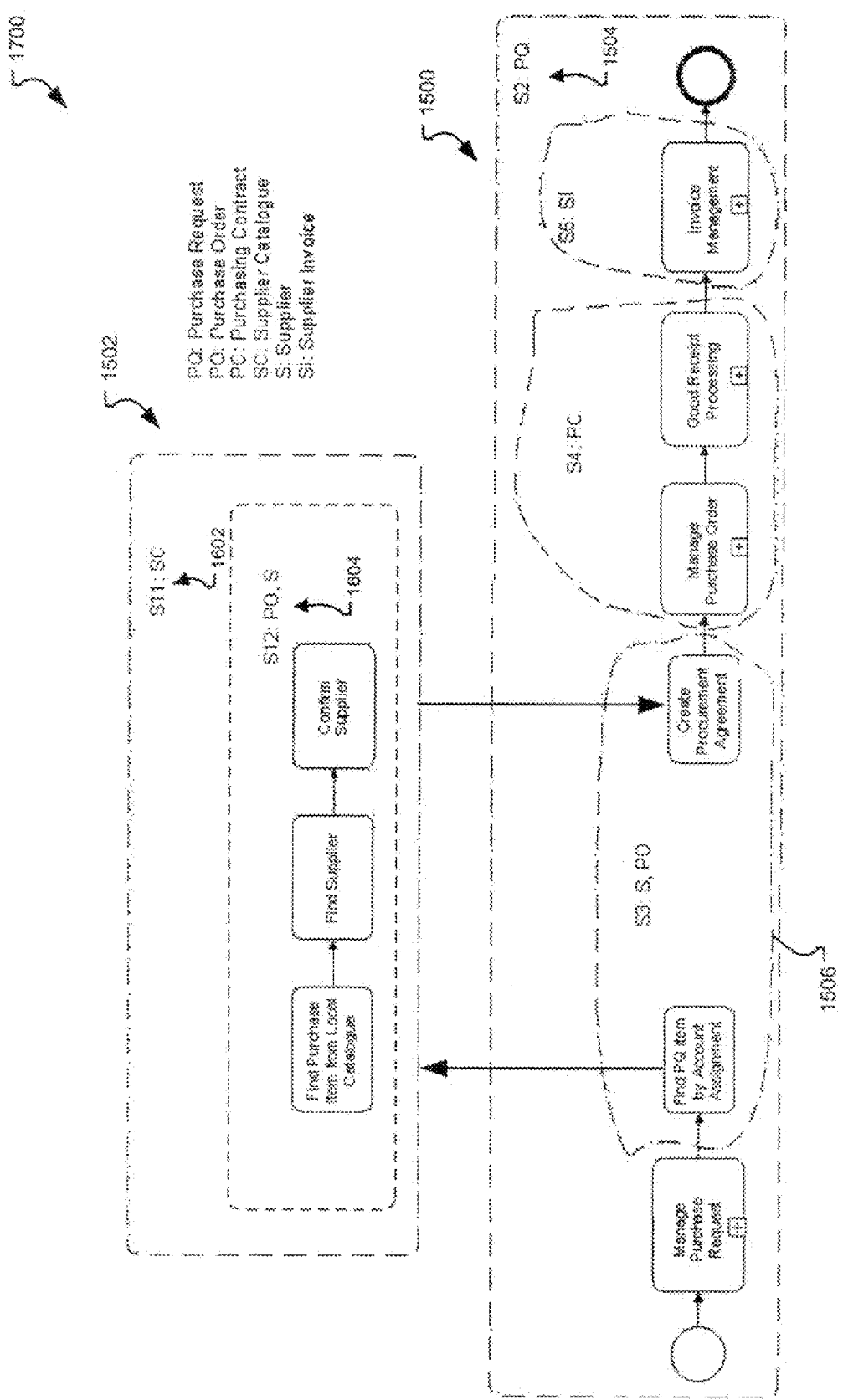
FIG. 17 is a block diagram illustrating an exemplar workflow model for applying workflow change operations.

FIG. 17 is a block diagram 1700 illustrating exemplar data visibility changes upon integrating the baseline workflow 1500 and the fragment workflow 1502. More specifically, FIG. 17 depicts an example of how a merge structural change operation can be performed on the workflow model 1500. FIG. 17 depicts the process model 1500 after the merge structural change, where two data scopes (e.g., (S12) 1604 and (S3) 1506) with the same data objects (S) and (PO) exist. Here, the external process fragment 1502 has been successfully merged with the baseline workflow 1500.

Figure 18:
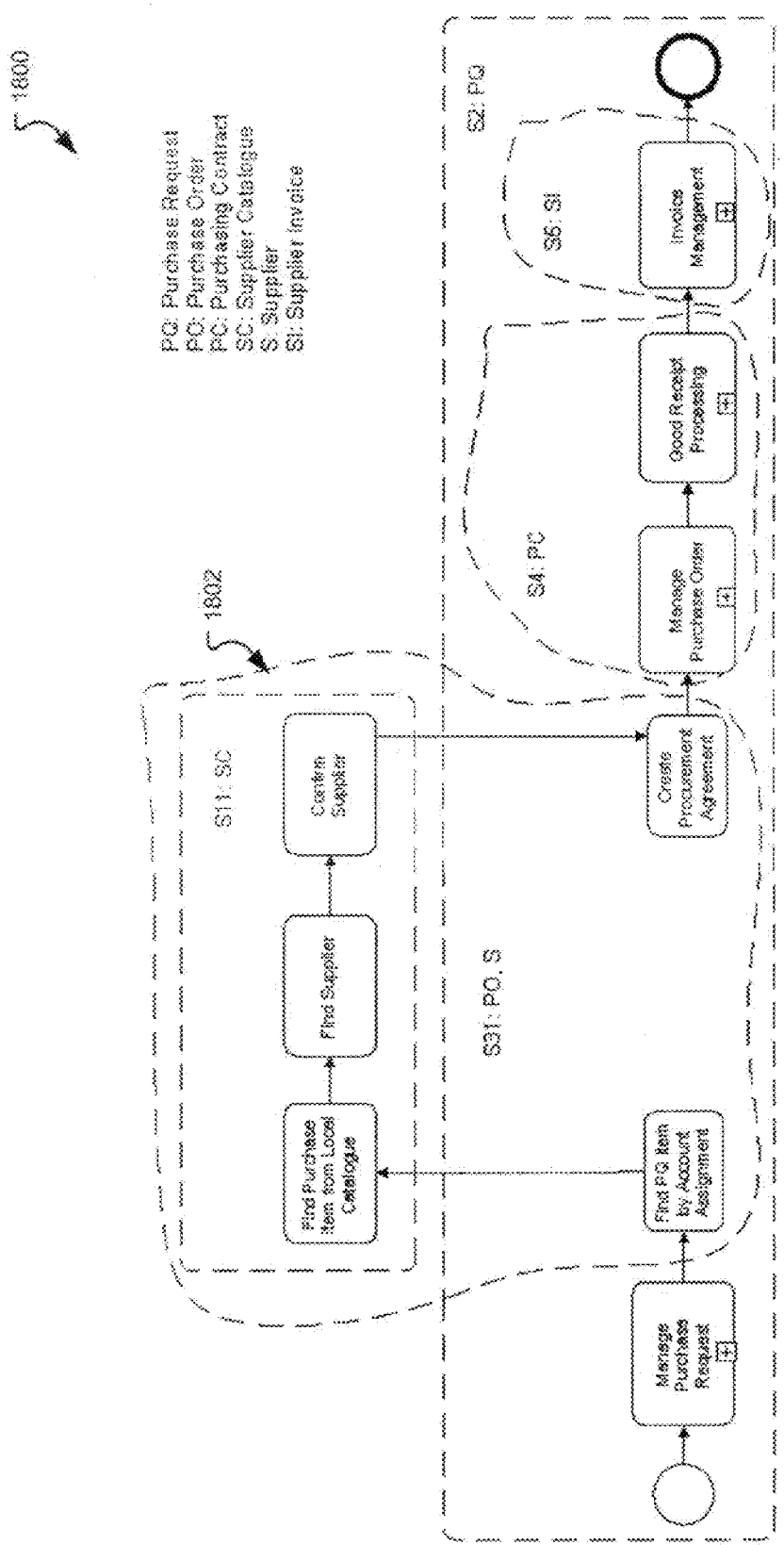
FIG. 18 is a block diagram illustrating an exemplar workflow model for adjusting data visibility definitions according to an implemented structural change.

FIG. 18 is a block diagram 1800 illustrating the exemplar workflow model 1500 after eliminating redundant process definitions. This process is a correctness process that can be performed to clean up the data visibility definitions as a result of the structural changes. In some implementations, the visibility operation is to merge data scopes with common data objects. In this example, the only overlap in data objects includes (PO) and (S). Accordingly, the system can merge the overlapping objects into one data scope. For example, the data scopes (S12) 1604 and (S3) 1506 are merged into a single data scope (S31) 1802 which contains the same data objects (PO) and (S) as in the data scopes (S12) 1604 and (S3) 1506. The diagram 1800 depicts an exemplary final process model in which the data scope definitions satisfy the data visibility correctness criteria. Other criteria can be merged or eliminated based upon other system rules or procedures.

Figure 19:
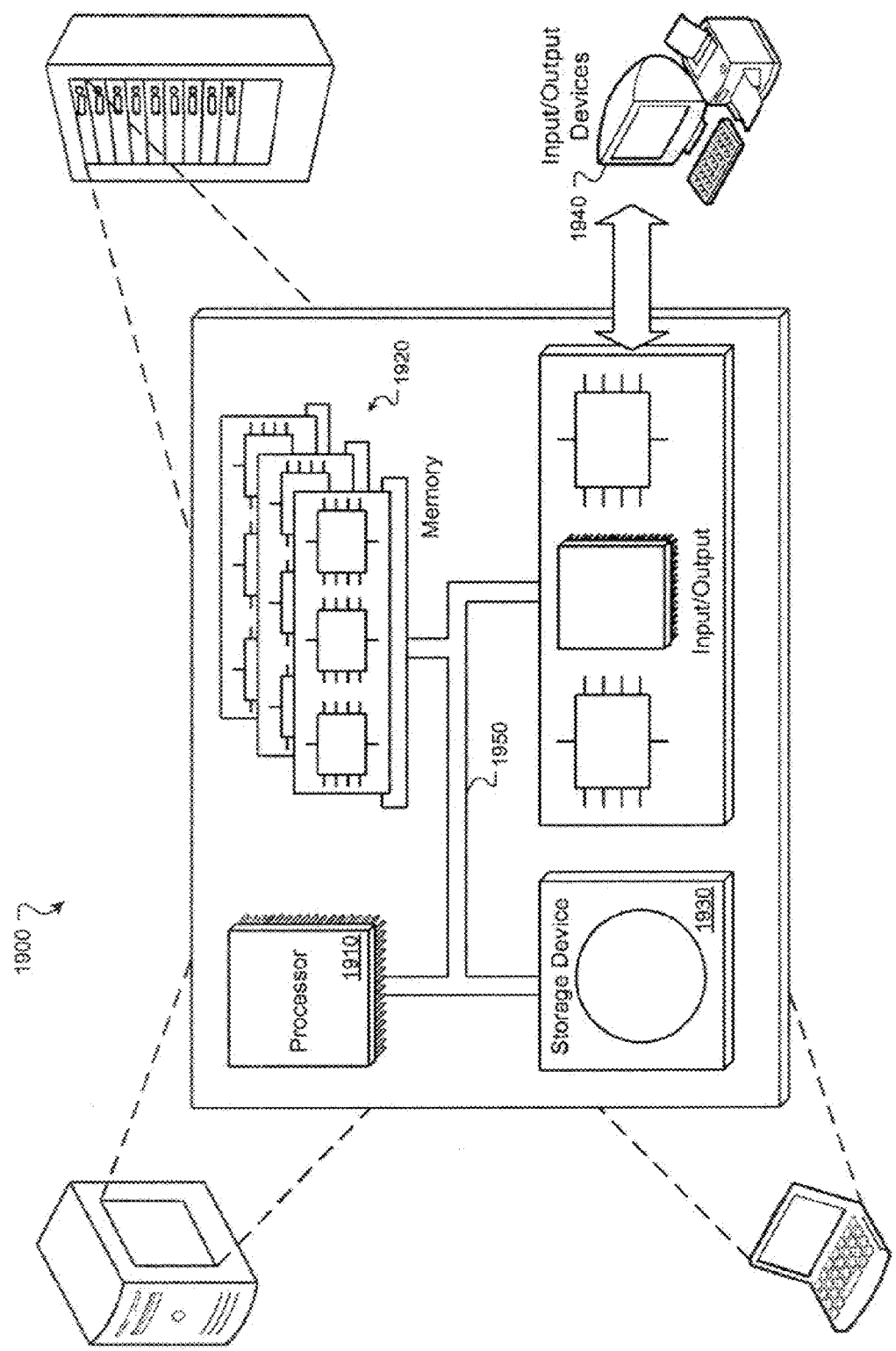
FIG. 19 is a schematic illustration of exemplar computer systems that can be used to execute implementations of the present disclosure.

Referring now to FIG. 19, a schematic diagram of an exemplar computer system 1900 is provided. The system 1900 can be used for the operations described in association with the methods described in FIGS. 12-14 according to one implementation. For example, the system 1900 may be included in any or all of the server components 102, 104, 106, or 108. The system 1900 includes a processor 1910, a memory 1920, a storage device 1930, and an input/output device 1940. Each of the components 1910, 1920, 1930, and 1940 are interconnected using a system bus 1950. The processor 1910 is capable of processing instructions for execution within the system 1900. In one implementation, the processor 1910 is a single-threaded processor. In another implementation, the processor 1910 is a multi-threaded processor. The processor 1910 is capable of processing instructions stored in the memory 1920 or on the storage device 1930 to display graphical information for a user interface on the input/output device 1940.

The memory 1920 stores information within the system 1900. In one implementation, the memory 1920 is a computer-readable medium. In one implementation, the memory 1920 is a volatile memory unit. In another implementation, the memory 1920 is a non-volatile memory unit. The storage device 1930 is capable of providing mass storage for the system 1900. In one implementation, the storage device 1930 is a computer-readable medium. In various different implementations, the storage device 1930 may be a floppy disk device, a hard disk device, an optical disk device, or a tape device. The input/output device 1940 provides input/output operations for the system 1900. In one implementation, the input/output device 1940 includes a keyboard and/or pointing device. In another implementation, the input/output device 1940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method of managing data scopes in a flexible workflow, comprising:
   providing a baseline workflow as an electronic representation of an actual workflow, the baseline workflow including a plurality of baseline tasks, a plurality of data items, and a plurality of baseline data scopes that indicate which baseline tasks are able to manipulate which data items of the plurality of data items;
   providing a fragment workflow as an electronic representation of an actual fragment workflow, the fragment workflow being separate from the baseline workflow, representing a fragment of a process and including at least one fragment task, and at least one fragment data scope, the at least one fragment data scope indicating data items of the plurality of data items that are able to be manipulated by the at least one fragment task;
   generating an integrated workflow by:
      identifying at least one of the plurality of baseline data scopes as an affected data scope based on a structural change operation, the baseline workflow and the fragment workflow, the structural change operation changing a structure of the baseline workflow based on the fragment workflow, the affected data scope being a data scope that is affected by the structural change operation;
      for each affected data scope, comparing data items of the affected data scope to data items of the at least one fragment data scope;
      determining that an overlap in data items exists between at least one affected data scope and the at least one fragment data scope, and in response identifying at least one data scope change operation;
      integrating the fragment workflow with the baseline workflow based on the structural change operation to provide the integrated workflow;
      executing the at least one data scope change operation to provide at least one integrated data scope in the integrated workflow; and
   providing the integrated workflow for execution.

2. The method of claim 1, wherein identifying at least one of the plurality of baseline data scopes as an affected data scope comprises:
   identifying at least one of the plurality of baseline data scopes as an affected data scope, when the structural change operation is within the at least one of the plurality of baseline data scopes; and
   identifying at least one of the plurality of baseline data scopes as an affected data scope, when the at least one of the plurality of baseline data scopes relates to at least one data item that is also related to a baseline data scope already identified as an affected data scope.

3. The method of claim 1, wherein, for each affected data scope, comparing the affected data scope to the at least one fragment data scope to identify at least one data scope change operation comprises at least one of:
   determining that data items related to the affected data scope are all common to data items related to the at least one fragment data scope, and identifying the at least one data scope change operation as a split of the affected data scope;
   determining that data items related to the at least one fragment data scope are all common to data items related to the affected data scope, and identifying the at least one data scope change operation as a split of the at least one fragment data scope; and
   identifying the at least one data scope change operation as a split of the affected data scope and a split of the at least one fragment data scope.

4. The method of claim 1, further comprising at least one of:
   preventing the at least one integrated data scope from expanding a data visibility of a fragment task within the integrated workflow;
   preventing the at least one integrated data scope from reducing a data visibility of a fragment task within the integrated workflow; and
   reducing a number of overlapping integrated data scopes within the integrated workflow.

5. The method of claim 1, wherein the at least one data scope change operation includes at least one of an add operation, a remove operation, an expand operation, a contract operation, a split operation and a merge operation.

6. The method of claim 1, further comprising:
   retrieving the baseline workflow from a plurality of baseline workflows stored in digital memory; and
   retrieving the fragment workflow from a plurality of fragment workflows stored in digital memory.

7. The method of claim 1, further comprising:
   instantiating the baseline workflow to generate an instance of the baseline workflow;
   executing the instance of the baseline workflow across a plurality of networked computers;
   instantiating the integrated workflow to generate an instance of the integrated workflow; and
   updating the instance of the baseline workflow being executed across the plurality of networked computers based on the instance of the integrated workflow.

8. A non-transitory computer-readable storage medium coupled to one or more processors having instructions stored thereon which, when executed by the one or more processors, cause the one or more processors to perform operations comprising:
   providing a baseline workflow as an electronic representation of an actual workflow, the baseline workflow including a plurality of baseline tasks, a plurality of data items, and a plurality of baseline data scopes that indicate which baseline tasks are able to manipulate which data items of the plurality of data items;
   providing a fragment workflow as an electronic representation of an actual fragment workflow, the fragment workflow being separate from the baseline workflow, representing a fragment of a process and including at least one fragment task, and at least one fragment data scope, the at least one fragment data scope indicating data items of the plurality of data items that are able to be manipulated by the at least one fragment task;
   generating an integrated workflow by:
      identifying at least one of the plurality of baseline data scopes as an affected data scope based on a structural change operation, the baseline workflow and the fragment workflow, the structural change operation changing a structure of the baseline workflow based on the fragment workflow, the affected data scope being a data scope that is affected by the structural change operation;

for each affected data scope, comparing data items of the affected data scope to data items of the at least one fragment data scope;

determining that an overlap in data items exists between at least one affected data scope and the at least one fragment data scope, and in response identifying at least one data scope change operation;

integrating the fragment workflow with the baseline workflow based on the structural change operation to provide the integrated workflow;

executing the at least one data scope change operation to provide at least one integrated data scope in the integrated workflow; and providing the integrated workflow for execution.

9. The storage medium of claim 8, wherein the operation of identifying at least one of the plurality of baseline data scopes as an affected data scope comprises:

identifying at least one of the plurality of baseline data scopes as an affected data scope, when the structural change operation is within the at least one of the plurality of baseline data scopes; and identifying at least one of the plurality of baseline data scopes as an affected data scope, when the at least one of the plurality of baseline data scopes relates to at least one data item that is also related to a baseline data scope already identified as an affected data scope.

10. The storage medium of claim 8, wherein, for each affected data scope, comparing the affected data scope to the at least one fragment data scope to identify at least one data scope change operation comprises at least one of:

determining that data items related to the affected data scope are all common to data items related to the at least one fragment data scope, and identifying the at least one data scope change operation as a split of the affected data scope;

determining that data items related to the at least one fragment data scope are all common to data items related to the affected data scope, and identifying the at least one data scope change operation as a split of the at least one fragment data scope; and identifying the at least one data scope change operation as a split of the affected data scope and a split of the at least one fragment data scope.

11. The storage medium of claim 8, wherein the operations further comprise at least one of:

preventing the at least one integrated data scope from expanding a data visibility of a fragment task within the integrated workflow;

preventing the at least one integrated data scope from reducing a data visibility of a fragment task within the integrated workflow; and reducing a number of overlapping integrated data scopes within the integrated workflow.

12. The storage medium of claim 8, wherein the at least one data scope change operation includes at least one of an add operation, a remove operation, an expand operation, a contract operation, a split operation and a merge operation.

13. The storage medium of claim 8, wherein the operations further comprise:

retrieving the baseline workflow from a plurality of baseline workflows stored in digital memory; and retrieving the fragment workflow from a plurality of fragment workflows stored in digital memory.

14. The storage medium of claim 8, wherein the operations further comprise:

instantiating the baseline workflow to generate an instance of the baseline workflow;

executing the instance of the baseline workflow across a plurality of networked computers;

instantiating the integrated workflow to generate an instance of the integrated workflow; and updating the instance of the baseline workflow being executed across the plurality of networked computers based on the instance of the integrated workflow.

15. A system for implementing visibility policies within a supply chain that includes a plurality of partners, comprising:

one or more processors; and a computer-readable storage medium coupled to the one or more processors having instructions stored thereon which, when executed by the one or more processors, cause the one or more processors to perform operations comprising:

providing a baseline workflow as an electronic representation of an actual workflow, the baseline workflow including a plurality of baseline tasks, a plurality of data items, and a plurality of baseline data scopes that indicate which baseline tasks are able to manipulate which data items of the plurality of data items;

providing a fragment workflow as an electronic representation of an actual fragment workflow, the fragment workflow being separate from the baseline workflow, representing a fragment of a process and including at least one fragment task, and at least one fragment data scope, the at least one fragment data scope indicating data items of the plurality of data items that are able to be manipulated by the at least one fragment task;

generating an integrated workflow by:

identifying at least one of the plurality of baseline data scopes as an affected data scope based on a structural change operation, the baseline workflow and the fragment workflow, the structural change operation changing a structure of the baseline workflow based on the fragment workflow, the affected data scope being a data scope that is affected by the structural change operation;

for each affected data scope, comparing data items of the affected data scope to data items of the at least one fragment data scope;

determining that an overlap in data items exists between at least one affected data scope and the at least one fragment data scope, and in response identifying at least one data scope change operation;

integrating the fragment workflow with the baseline workflow based on the structural change operation to provide the integrated workflow;

executing the at least one data scope change operation to provide at least one integrated data scope in the integrated workflow; and providing the integrated workflow for execution.

16. The system of claim 15, wherein the operation of identifying at least one of the plurality of baseline data scopes as an affected data scope comprises:

identifying at least one of the plurality of baseline data scopes as an affected data scope, when the structural change operation is within the at least one of the plurality of baseline data scopes; and identifying at least one of the plurality of baseline data scopes as an affected data scope, when the at least one of the plurality of baseline data scopes relates to at least one data item that is also related to a baseline data scope already identified as an affected data scope.

17. The system of claim 15, wherein, for each affected data scope, comparing the affected data scope to the at least one fragment data scope to identify at least one data scope change operation comprises at least one of:
- determining that data items related to the affected data scope are all common to data items related to the at least one fragment data scope, and identifying the at least one data scope change operation as a split of the affected data scope;
- determining that data items related to the at least one fragment data scope are all common to data items related to the affected data scope, and identifying the at least one data scope change operation as a split of the at least one fragment data scope; and
- identifying the at least one data scope change operation as a split of the affected data scope and a split of the at least one fragment data scope.

18. The system of claim 15, wherein the operations further comprise at least one of:
- preventing the at least one integrated data scope from expanding a data visibility of a fragment task within the integrated workflow;
- preventing the at least one integrated data scope from reducing a data visibility of a fragment task within the integrated workflow; and
- reducing a number of overlapping integrated data scopes within the integrated workflow.

19. The system of claim 15, wherein the at least one data scope change operation includes at least one of an add operation, a remove operation, an expand operation, a contract operation, a split operation and a merge operation.

20. The system of claim 15, wherein the operations further comprise:
- retrieving the baseline workflow from a plurality of baseline workflows stored in digital memory; and
- retrieving the fragment workflow from a plurality of fragment workflows stored in digital memory.

21. The system of claim 15, wherein the operations further comprise:
- instantiating the baseline workflow to generate an instance of the baseline workflow;
- executing the instance of the baseline workflow across a plurality of networked computers;
- instantiating the integrated workflow to generate an instance of the integrated workflow; and
- updating the instance of the baseline workflow being executed across the plurality of networked computers based on the instance of the integrated workflow.

* * * * *